United States Patent [19]

Bendig

[11] Patent Number: 4,581,484

[45] Date of Patent: Apr. 8, 1986

[54] AUDIO-ENHANCED VIDEOTEX SYSTEM

[75] Inventor: Mark W. Bendig, Columbus, Ohio

[73] Assignee: OCLC Online Computer Library Center Incorporated, Dublin, Ohio

[21] Appl. No.: 427,904

[22] Filed: Sep. 29, 1982

[51] Int. Cl.⁴ ..................... H04M 11/00; G06F 3/00
[52] U.S. Cl. ................................. 179/2 DP; 364/900
[58] Field of Search ............................. 364/200, 900; 381/36-53; 179/2 DP, 2 A

[56] References Cited

U.S. PATENT DOCUMENTS

| | | | |
|---|---|---|---|
| 3,654,708 | 4/1972 | Brudner | 179/2 TV |
| 3,668,312 | 6/1972 | Yamamoto et al. | 178/6.8 |
| 3,685,039 | 8/1972 | Flanagan | 340/324 A |
| 3,757,037 | 9/1973 | Bialek | 178/6.6 A |
| 3,822,363 | 7/1974 | Moyer et al. | 179/2 TV |
| 3,872,446 | 3/1975 | Chambers | 364/200 |
| 3,909,818 | 9/1975 | Dalke et al. | 340/324 AD |
| 4,007,443 | 2/1977 | Bromberg et al. | 364/200 |
| 4,121,283 | 10/1978 | Walker | 364/200 |
| 4,150,254 | 4/1979 | Schussler et al. | |
| 4,161,728 | 7/1979 | Insam | 340/750 |
| 4,191,956 | 3/1980 | Groothuis | 340/789 |
| 4,251,691 | 2/1981 | Kakihara et al. | 179/2 TV |
| 4,330,687 | 5/1982 | Foulkes et al. | 179/2 DP |
| 4,330,886 | 5/1982 | Fukuda et al. | 179/2 DP |
| 4,403,322 | 9/1983 | Kato et al. | 179/2 DP |
| 4,475,189 | 10/1984 | Herr et al. | 179/2 DP |
| 4,476,559 | 10/1984 | Brolin et al. | 179/2 DP |
| 4,503,288 | 3/1985 | Kessler | 179/2 DP |

OTHER PUBLICATIONS

Ronald G. Parsons, "An Answer/Originate Modem", 6-1980, pp. 24, 26, 28, 30, 32, 34, 36, 38 and 40.
Lexis, "A Primer", pp. 1-17, copyright 1980 by Mead Data Central.

Primary Examiner—Eddie P. Chan
Attorney, Agent, or Firm—Mueller and Smith

[57] ABSTRACT

A system and apparatus for providing information exchange between a host computer facility and a remotely located user terminal. The host facility includes an audio memory under the control of a host computer which, in response to requests from the user facility is actuated to transmit audio information to the user terminal. During this audio mode of operation, carrier tones are removed and telephone interface components associated with the user terminal and host facility are enabled. The system further includes an interactive audio mode of operation wherein two-way telephonic communication is established between an intermediary or operator associated with the host facility and the user terminal. The related computer programs of the host facility and user terminal are configured such that control over the user facility from the host facility is emphasized.

34 Claims, 11 Drawing Figures

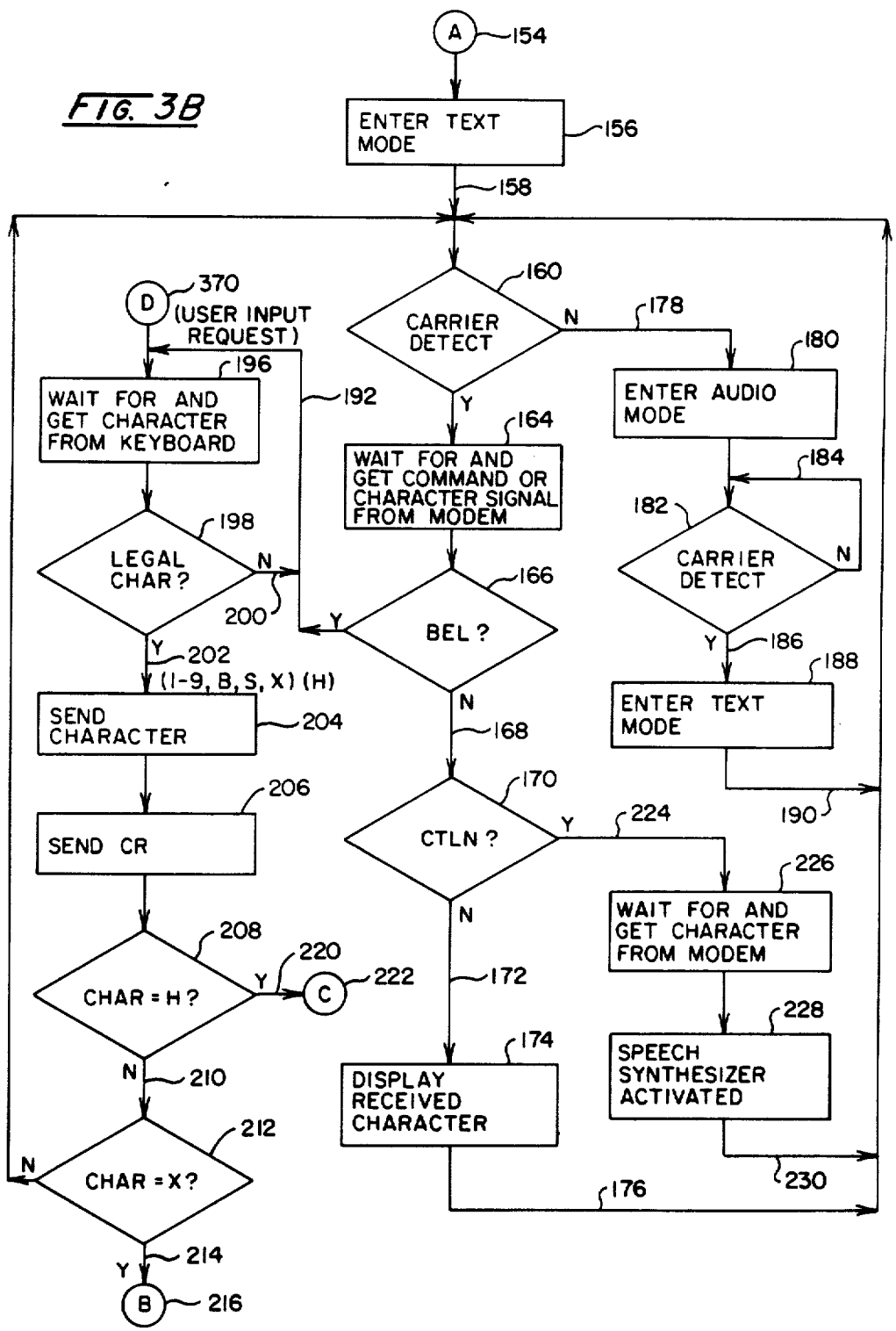

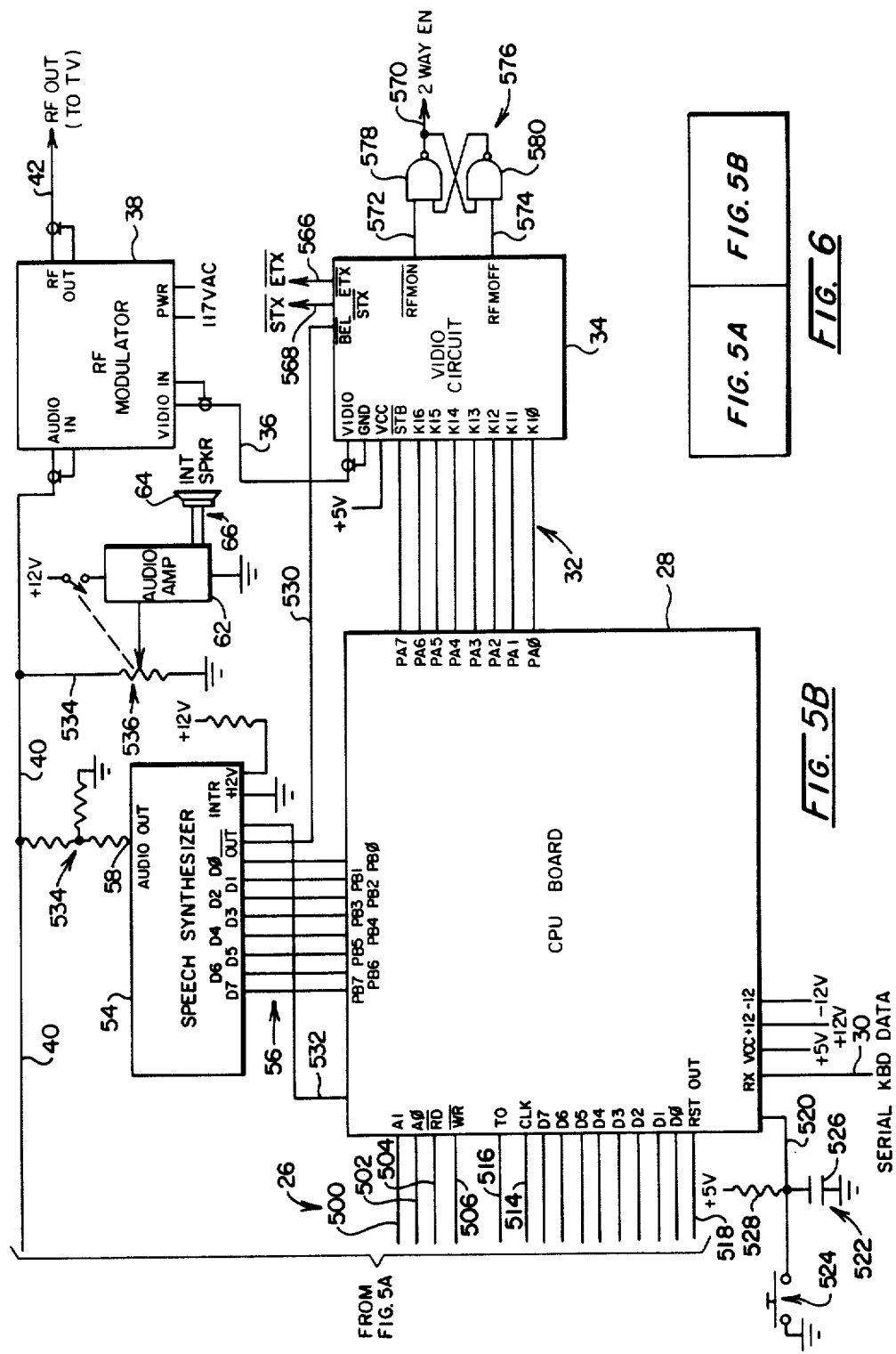

AUDIO-ENHANCED VIDEOTEX SYSTEM

BACKGROUND

Over the recent past a variety of computer based information systems have been proposed or introduced to the public on commercial as well as experimental bases. These systems have evolved in consequence of the development of large data base computer capabilities and provide for an expanded distribution of information to the consuming public. Certain of the commercial systems are structured for data dissemination via telephonic links from centralized host computer facilities to terminals. Interactive communication is achieved at these terminals through keyboards operating in conjunction with cathode ray tubes and/or printer readout components. In effect, the subscribing operator of such remote terminal keyboards is given access to a highly sophisticated computer system having a very large data bank.

Of course, to effectively use the keyboard terminal, the subscriber must have a reasonable familiarity with the access protocols and related procedures required to carry out an effective dialogue with the host computer facility. These procedures may become somewhat involved in view of the sophistication and versatility of large data base facilities. In efforts to provide accessibility to these information systems on the part of a greater segment of the public, it has become necessary to develop terminal equipment which considerably simplifies the procedures or protocols required to gain access to the host computer. For example, videotex systems have been devised wherein data is displayed at the subscriber's television receiver. Requisite telephonic communication with the host computer facility is carried out through a "user friendly interface" arrangement wherein dialogue protocol are automated and selection of information from the data bank is achieved through menu tree selection indexing. With this indexing technique, a very general, numerically identified categorization of subject matter initially is displayed to the subscriber, one such very general category then being selected by depressing an appropriate corresponding numerical key on the keyboard. Upon such selection, the host computer transmits a next numerically identified categorization of subject matter for display at the subscriber's television screen, such subject matter corresponding to a slight elaboration of the earlier selection. This procedure is continued until the selected subject area becomes so finite as to permit an ultimate selection.

As is apparent, this simplification of the procedure accessing the host data base will become overly time consuming and laborious as the subject matter available at the host facilities increases in extent. In effect, the menu tree indexing approach may itself become so complex as to preclude its practicality.

One highly regarded potential application of videotex systems is that associated with the provision of library services. Subscribers of the service would utilize terminals installed in a home environment or other suitable locations to access a library host computerized reference system. Encyclopedic and other reference materials desired would be accessed and transmitted to the user terminal from the host computer. Where books are desired to be taken out on loan, following the accessing of the host computer through appropriate reference procedures, orders could be placed to the library through the system for mail delivery of books and the like. Thus, the subscriber remotely receives essentially the full complement of library services without the necessity of traveling to the library itself.

To provide such remote library services, however, a practical user friendly interface with the host library computer system would be required. Referencing techniques such as the above-noted menu tree selection indexing may be suited for relatively simple, straightforward request. However, as the user inquiries become more involved to the extent of becoming reference system searches, the simplified procedures heretofore contemplated will, for the most part, fail. For example, the generally unsophisticated subscriber, in effect, becomes interfaced with a highly sophisticated host computer system having data access capability equivalent to the reference floor of a major library. Generally, the typical library patron would look to the expertise of a well-trained reference librarian when encountering a reference facility search requirement. When this expertise of the reference librarian is called upon, a dialogue with the patron ensues wherein the librarian is able to draw out the essence of the subject matter desired. Then, by-passing perhaps large amounts of reference information which the untrained would inaccurately turn to, the librarian will quickly isolate those catalog regions the subject of which is of interest to the patron. While computer accessing techniques may be capable of developing the same isolation of catalogue materials, a sophistication on the part of that person accessing the correspondingly sophisticated computer program is required.

A characteristic of the videotex systems heretofore introduced or proposed has been their dedication to the textual presentation of information. For example, any interaction between the subscriber and host computer has been one wherein text materials are silently displayed on a video screen in correspondence with a silent keypad or keyboard manipulation at the user terminal. While transmission is carried out through the use of modems over telecommunication links, no form of transmission in the audible range has been contemplated as a complement to the textual presentations.

SUMMARY

The present invention is addressed to a system and related decoder apparatus for providing information exchange between a host computer facility and a remotely located user terminal. These components of the system operate in complement in a text mode, an audio mode and an interactive audio mode.

At the host facility, an audio memory, such as a randomly accessable magnetic disk arrangement is provided which operates under the control of the host computer, the memory function of which includes an audio mode index. Upon the transmission of appropriate request signals from the user terminal, the carrier tones of both the host facility and the user terminal are turned off and the audio memory is actuated to effect the transmission of telephonic audio signals over the telephone link between the components to the user facility. The decoder apparatus at the user facility may include a keyboard and appropriate circuitry wherein it operates in conjunction with a conventional television receiver. Thus, the textual materials which are transmitted from the host facility are converted to video signals for transmission to the television screen through appropriate connections and modulators, while the audio information is transmitted for broadcast through the loudspeaker of the television receiver. At the termination of transmission of a given segment of audio information, for example, a motet, a famous speech, or recordations of portions of an historic event, the host facility reasserts its carrier tone to effect re-entry of the system into a text mode and the user terminal detects the presence of this carrier to, on its own part, return to a text mode of operation, its own carrier tone being restored.

Control over the interactive performance of the system remains substantially with the host facility, request characters being transmissible from the user terminal only upon the previous transmission of command signals from the host computer. Further in this regard, the user terminal incorporates a terminal computer having a program which permits the transmission of only predetermined request signals.

As another aspect and object of the invention, the host computer facility incorporates an operator station having a terminal with appropriate readout devices and an interactive audible communication capability which permits two-way telephone conversations to occur between an operator employed in conjunction with the host facility and the user at the remote user terminal. In complement with this, the user terminal incorporates a microphone in conjunction with its telephone interface components to permit the user to conduct a normal two-way telephone conversation with the operator at the operator station. The operator's voice is transmitted such that it is heard by the user through the loudspeaker arrangement of the television facility user may terminate a conversation by appropriate actuation of the keyboard. Thus, an intermediary may be interposed within the textual dialogue taking place between the host computer and the user terminal. The operator station may be provided in conjunction, for example, with the talents of a qualified reference librarian or, for such services as banking, a bank teller may become such an intermediary.

Another feature and object of the invention is to provide a system wherein interactive information exchanged by telephonic linkage between a host facility and a user terminal is made available. The system includes a host facility having a host computer under the control of a host program for operating alternatively in a text mode and audio mode and additionally having both a text memory and an audio mode index memory. The host facility further includes a host modem which is operatively associated with the host computer and the telephonic linkage and which selectively is enabled to assert a host carrier tone upon the telephonic linkage to effect the transmission thereupon of textual data selected from the text memory. An audio memory which is actuable in response to indexing signals from the host computer serves to generate an interval of select audio signals at an output thereof. A host telephone interface is coupled intermediate the telephonic linkage and the audio memory output and is actuable in response to signals from the host computer for effecting the transmission of the audio signals as audio telephonic signals over the linkage during the audio mode performance. The system further includes a user terminal which comprises a terminal computer under the control of a terminal program for operating alternately in a text mode and an audio mode. A keyed arrangement such as a keyboard is coupled with the terminal computer and is manually actuable to transmit character signals thereto. The user terminal further includes a terminal modem which is operatively associated between the terminal computer and the telephonic linkage and is actuable to selectively assert a terminal carrier tone upon the linkage to effect transmission thereupon of the character signals. A terminal telephone interface is coupled with the telephonic linkage and is enabled under the control of the terminal computer during an audio mode thereof to receive transmitted audio telephonic signals and convert them to audio signals. The user terminal further includes a readout arrangement which is responsive to the terminal computer and the terminal telephone interface for displaying transmitted textual data during a text mode and for generating audible signals in response to the terminal telephone interface audio signals during an audio mode of performance of the system.

Another object of the invention is to provide a system offering interactive information exchange by telephonic linkage between the host facility and a user terminal which includes a user terminal having a terminal modem coupled with the telephonic linkage and selectively actuable to assert and remove a terminal carrier tone for the transmission of request signals and for the reception of textual character and command signals over the linkage. The terminal further includes a terminal telephone interface which is coupled with the telephonic linkage and is selectively actuable for receiving telephonic audio signals and converting them to audio signals and for transmitting telephonic audio signals corresponding with user terminal derived audio signals asserted at a select input thereof. Additionally, the facility includes a microphone which is coupled with the terminal telephone interface input for generating user terminal derived audio signals from user speech when enabled. The user terminal further includes a keyed arrangement such as a keyboard which is manually actuable for generating the aforesaid request signals. A readout arrangement is provided having an input for receiving textual character signals conveyed thereto and for displaying readable characters corresponding therewith. Thus readout arrangement further receives conveyed audio signals for generating audible signals corresponding thereto. The user terminal includes a terminal computer under the control of a terminal program which operates in a text mode and in an interactive audio mode and which effects a response to a textual character signal when in the text mode for effecting the conveyance thereof to the readout arrangement. The program further effects a response of the computer to a command signal when in text mode for effecting the transmission of a request signal generated by the terminal keyed arrangement, one available such request signal being an interactive audio communication request signal. Additionally, the program effects a response to an operator acknowledge signal received at the terminal modem subsequent to the interactive audio communication request signal to provide for the actuation of the terminal modem to remove its terminal carrier tone as well as the actuation of the terminal telephone interface and the enablement of the microphone thus to permit telephonic communication.

The system further includes a host facility having a host modem coupled with the telephonic linkage for transmitting signals thereupon and receiving signals therefrom and which is actuable to selectively assert a host carrier tone and remove it from the telephonic linkage. This host facility further includes a telephone interface coupled with the telephonic linkage for communicatively receiving and transmitting audio telephonic signals thereover and which is selectively actuable to effect this communication. An operator station is provided in conjunction with the host facility which includes an interactive audible communication arrangement such as a headset which is operatively associated with the host telephone interface and which is actuable for enabling verbal communication therethrough on the part of an operator. The operator station further includes terminal having an input for receiving and displaying character signals as well as a key arrangement such as a keyboard which is manually actuable for transmitting signals such as predetermined answer signals such as operator acknowledge signals and an interactive audio mode termination signal, the latter effecting a termination of a two-way audio conversation with the user terminal. Further incorporated with the host facility is a host computer under the control of a host program which operates in a text mode and interactive audio mode and which is coupled with the host telephone interface, the host modem and the operator station terminal. The host computer is operative in the text mode in response to an interactive audio communication signal and an operator acknowledge signal to assume the noted interactive audio mode wherein the host modem is actuated to remove its carrier tone and the host telephone interface is actuated and, additionally, the operator station interactive audible communication arrangement is actuated or enabled. Further, the host program is responsive to the interactive audio mode termination signal for re-entering a text mode.

Another object of the invention is to provide decoder apparatus for telephonic interactive communication with a host computer facility, such facility being configured to selectively transmit textual character and command signals in conjunction with a host carrier tone as well as audio memory derived telephonic audio signals in the absence of the host carrier tone over a telephonic linkage. The apparatus includes a modem which is connectable with the telephonic linkage and which is selectively actuable to assert and remove a terminal carrier tone at the telephonic linkage and which provides a carrier detect signal in the presence of the host carrier tone. A telephone interface is provided which telephonically connects with the telephonic linkage and which is actuable to provide audio signals corresponding with the audio memory derived telephonic audio signals at an output. Additionally, keyed arrangement such as a keyboard is provided which is manually actuable to generate selected request signals. Further, the decoder apparatus includes a terminal computer under the control of a program which operates in a text mode and an audio mode and which is coupled in controlling relationship with the modem and the telephone interface and which is coupled with the keyed arrangement for receiving selected request signals. The program of the terminal computer effects the actuation of the modem to assert the carrier tone when in a text mode and is responsible to the carrier detect signal to effect a conveyance of transmitted textual character signals to an output. This computer further is responsive to command signals in the presence of the carrier detect signal to effect transmission of selected request signals from the modem and is responsive when in the text mode to the absence of the carrier detect signal to enter the audio mode wherein the computer program effects the actuation of the modem to remove the terminal carrier tone and effects the actuation of the telephone interface to receive transmitted audio memory derived telephonic audio signals. The apparatus further includes a connector arrangement for coupling the telephone interface output and the terminal computer output with a suitable audible and visual readout. Such decoder apparatus further may include an arrangement wherein the telephone interface is configured having a terminal audio input for providing telephonic communication along the telephonic linkage. The apparatus additionally may include a microphone coupled with the audio input for transmitting voice signals asserted thereupon when enabled. The terminal computer control program may then be operative in an interactive audio mode wherein the computer is responsive to a command signal for effecting the select transmission of a request signal representing an interactive communication request signal and to a subsequent removal of the host carrier tone for effecting actuation of the modem to remove the terminal carrier tone and for effecting the actuation of the telephone interface and the enablement of the microphone.

Other objects of the invention will, in part, be obvious and will, in part, appear hereinafter.

The invention, accordingly, comprises the apparatus and system possessing the construction, combination of elements, and arrangement of parts which are exemplified in the following detailed disclosure.

For a fuller understanding of the nature and objects of the invention, reference should be had to the following detailed description taken in conjunction with the accompanying drawings.

BRIEF DESCRIPTION OF THE DRAWINGS

FIGS. 3A-3C represent a flow chart showing a control program for utilization with the user terminal described in conjunction with FIG. 1;

FIGS. 5A and 5B show a schematic diagram of the circuit arrangement of a decoder utilized in conjunction with the user terminal of the system of the instant invention; and FIG. 6 is a diagram showing the appropriate placement of FIGS. 5A and 5B.

DETAILED DESCRIPTION

The system of the present invention involves a computer facility having a database structured to carry relatively large amounts of information related to any of a variety of services such as encyclopedic, library, banking, shopping and the like. This principal computer and related database is referred to as the host facility and is selectively accessed via telephone communication from remote decoder keyboard terminals, each of which is operated in conjunction with the screen of a conventional television receiver, as well as in conjunction with a direct telephone line connection. These remote access stations are referred to as "user terminals". The host facility and user terminals operate in an interactive manner generally under host control in either text, interactive audio or audio modes. When performing in one aspect of the interactive audio mode, the user accessing the host terminal will have caused the transmission of a control code which alerts a human specialist at the host facility to respond to inquiries in the manner of a normal telephone conversation. Thus, a person having specialized expertise is interposed as an intermediary in the process of generating desired information or data. Further, this same intermediary may be interposed as a form of supervisory control over the access to what usually is present as an enormous and most valuable database. When operating in the audio mode, prerecorded and stored audio materials such as historic speeches, animal sounds, various languages for teaching purposes, music and the like are telephonically communicated by the host facility to the loudspeaker of a readout facility such as a television receiver at the user terminal.

In the discourse to follow, the user terminal decoder arrangement initially is discussed in general terms followed by a corresponding discussion of the components of the host facility. Following this discourse, the programs under which these components of the system operate are discussed with respect to text mode and audio operation, following which their performance within an interactive audio mode of operation is examined. Lastly, a detailed description of the structure of the decoder component of the user facility is provided.

Figure 1:
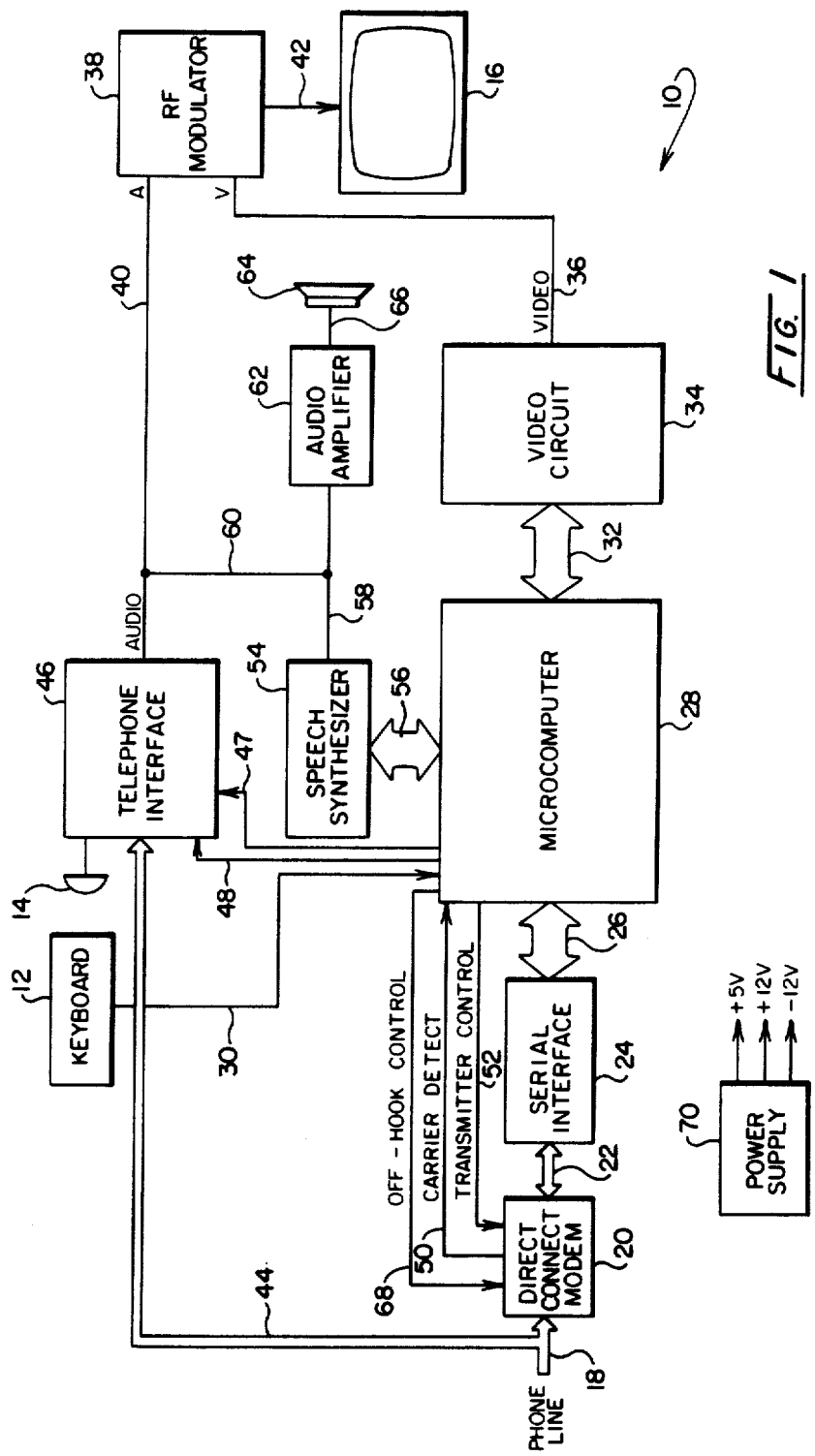
FIG. 1 is a block schematic diagram showing a user terminal utilized in conjunction with the system of the instant invention.

Referring to FIG. 1, a typical user terminal is revealed generally at 10 and is shown to provide the user with an alpha-numeric keyboard 12, a microphone 14 and a conventional television receiver 16 which are associated with the host facility through a conventional telephone linkage such as two-wire telephone line 18. With the arrangement, the user communicates via the telephone system by operating keyboard 12, observing the screen of television receiver 16, speaking with an intermediary host facility operator through microphone 14 and receiving audio information through the loudspeaker of television receiver 16.

While various forms of readout for the user terminal 10 are available, where somewhat widespread use of the system is contemplated, lower terminal costs may be achieved through utilization of the video and audio features of the ubiquitous television receiver. Telephonic linkage or line 18 is coupled to a direct connect modem 20. Modem 20, while carrying out the conventional function of modulation and demodulation in conjunction with a predetermined carrier tone, also functions to provide telephonic operational logic including dialing, host facility carrier detection at line 18 and transmission control. The modulation-demodulation function of modem 20 provides for the reception and transmission of data at a 300 baud rate utilizing Bell 103 standard tones. Serial data input to and output from modem 20 is represented by bi-directional communication line 22, which, in turn, is coupled with a serial interface network 24. Interface network 24 serves to convert serial data submitted thereto from line 22 to an 8-bit word presented in parallel fashion along bi-directional bus 26 to a data port of an all purpose single board microcomputer 28. Microcomputer 28 may, for example, be provided as a type MCG-85 marketed by Atlantis Computers, Astoria, N.Y. 11106. The device carries out normal computer functions and includes RAM for storage of temporary variables and the like as well as ROM control store features. Additionally provided are programmable, 8-bit I/O ports, serial I/O port facilities and conventional control inputs and outputs.

The serial input to microcomputer 28 is coupled through RS232 two-wire serial link 30 to the output of alpha-numeric keyboard 12. Keyboard 12, for example, may be present as a type VP606 marketed by RCA Microcomputer Products, Lancaster, Pa. 17604. Such devices conventionally operate utilizing a keyboard matrix scanning network in conjunction with ASCII encoding electronics and serial transmitter components. One 8-bit output of microcomputer 28 is represented at bus 32 extending to a video circuit 34. Circuit 34 is designed to receive ASCII textual character signal data from bus 32 and, during text mode operation, provide an NTSC compatible composite base band video signal at its output line 36. In this regard, the circuit 34 operates to receive 8-bit ASCII character words at bus 32 which may be derived from memory within microcomputer 28, from keyboard 12 as treated by computer 28 or in consequence of host transmissions ultimately asserted at the microcomputer 28 from along bus 26. The circuit 34 includes memory such that one entire screen can be retained while another is displayed. During the transmission of audio information from the host facility, the text mode information generated from video circuit 34 will remain displayed on the screen of television receiver 16, the video circuit 34 memory being adequate for this purpose. The circuit 34, may, for example, be present as a video circuit marketed under the trade designation ESAT-100. Base band video output of video circuit 34 at line 36 is introduced to the video input of an RF modulator circuit 38 which accepts this input and converts it along with any audio input at line 40 into a standard television signal of predesignated channel which is provided at shielded output line 42. Line 42, in turn, includes a "F" type connector for coupling with conventional television receiver 16. Modulator 38, may, for example, be provided as a Micro-verter II model marketed by ATV Research, Dakota City, Neb. 68731.

The audio signal presented to RF modulator circuit 38 from along line 40 may emanate from two sources. The initial one of these sources derives from telephone line 18 which extends in conventional two-wire fashion represented at 44 to the input of a telephone interface circuit 46. Interface circuit 46 is enabled by signal from microcomputer 28 via a connection generally represented by line 47. Thus enabled, the telephone interface will accept telphonic audio signals from linkage 44 and transmit them as audio signals along line 40. Such actuation or enablement is provided both for audio mode and interactive audio mode performance. When enabled specifically for interactive audio mode operation, microphone 14 additionally is enabled as activated by microcomputer 28 as is generally represented by line 48. Thus actuated for audio interactive performance, the interface 46, operating in conjunction with microphone 14 serves to establish a conventional two-way telephone linkage between the operator of the user terminal 10 utilizing microphone 14 and the speaker of television receiver 26 and an intermediary such as a reference librarian or the like present at the host facility. Two-way conversation is established in conjunction with a command-request signal arrangement between microcomputer 28 and the host facility. For example, where the carrier for text mode transmission is caused to be removed by the host, such removal is detected as represented at line 50 at modem 20 by microcomputer 28. Upon such detection, microcomputer 28 disables direct connect modem 20 and removes the user facility or decoder carrier via control commands to modem network 20 asserted through an arrangement represented at line 52. Where two-way conversation is not desired, but audio mode information is to be transmitted by the host facility, then such audio information is transmitted via linkage 44 through interface 46 and lines 40 to RF modulator 38. For example, as part of an encyclopedic request on the part of the user, a recorded sonata or the like may be presented as an audio signal to modulator 38 from telephone interface 46. On the other hand, where the user finds difficulty in locating a certain desired textual and/or audio material, a two-way linkage may be established such that the user may directly converse on a two-way basis with an expert at the host facility.

Interface circuit 46 may assume a variety of configurations available in the marketplace. For example, a circuit marketed as a "Telephone Amplifier" model GD-1112 by Heath Company, New York, N.Y., may be utilized for the instant function.

A next input to RF modulator 38 via linkage 40 may be derived from a speech synthesizer circuit represented at block 54. Speach synthesizer circuits as at 54 may take any of a variety of configurations, that preferred with the instant user facility being of a more cost effective, limited vocabulary type having a stored vocabulary of 144 expressions. More elaborate synthesizers are available, for example, deriving speech constructs utilizing phoneme techniques. One circuit suited for the instant application is marketed as a Micromouth speech synthesizer interface by micromint, Inc., Woodmere, N.Y. 11598. Synthesizer circuit 54 is operated under the command of an 8-bit parallel input from microcomputer 28 as represented at bus 56. The synthesizer is capable of generatng prompting words as well as generally useful information such as the time of logging on and the like. Preferably, the generation of speech from the circuit at block 54 is under the control of the host facility, inasmuch as that facility has a higher memory capacity and this arrangement further is in keeping with an aspect of the system for maintaining control over the interaction between the user facility 10 and the host facility at the host facility itself. The output of the speech synthesizer circuit 54 is provided at line 58 which is directed through line 60 to audio line 40. Line 58 further may be directed to an audio amplifier as represented by block 62. Amplifier 62 serves to drive a conventional loudspeaker 64 through line 66. The provision of this auxiliary audio output is somewhat arbitrary, it being found convenient to incorporate such a feature for purposes of testing and as a standby audio output in the event of breakdown of the audio components of television receiver 16.

In a preferred embodiment, the generation of communication between the user facility 10 and the host facility is automated to the extent possible. In this regard, the microcomputer circuit 28 exerts an off-hook control to the direct connect modem 20 as represented by line 68. With such an arrangement, dialing as well as hangup can be effected automatically at the user facility 10. A conventional power supply for the facility 10 is represented at block 70, the power supply providing, for example, +5 v for the LSI components and higher levels at, for example, 12 volts for the operation of direct connect modem 20, speech synthesizer circuit 54, audio amplifier 62 and telephone interface 46.

Figure 2:
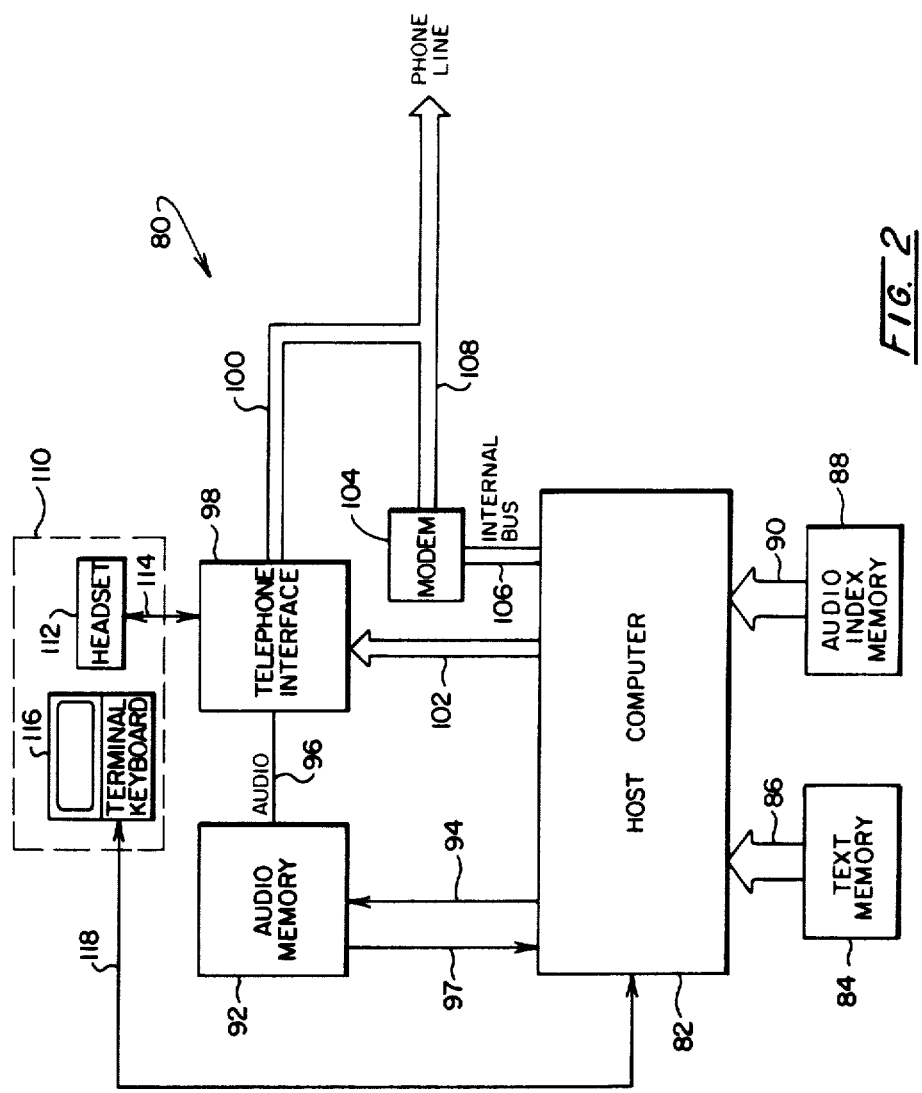
FIG. 2 is a block schematic diagram showing the components of a host facility used in conjunction with the system of the present invention.

Turning to FIG. 2, a general, block diagrammatic representation of the host facility is represented generally at 80. Host facility 80 will include a main frame computer system represented at block 82, the size or extent of which will depend upon the particular service rendered and database involved. As indicated earlier herein, such services may include encyclopedic, library services providing books by mail, banking services and shopping by mail. Many other services will occur to the reader. The computer 82, however, includes programming permitting its operation in an audio mode and an interactive audio mode as well as a text mode. To provide the database for the text mode, a text memory as represented generally by block 84 is associated with the computer 82 through bus 86. Computer 82 additionally accesses an audio index memory represented by block 88 and associated therewith through bus 90. Text Memory 84 and Audio Index Memory 88 may be groups of files on the same memory device such as a floppy disk within the facility. The audio index memory provides indexing data such that the computer 82 may access the location of audio recorded data for effecting the telephonic transmission thereof to user facility 10. In this regard, the host facility 80 includes an audio memory function represented at block 92. Audio memory function 92 may include a plurality of random access audio devices which are under the control of computer 82 through conventional RS232 serial linkages as represented by line 94 extending between these components. The devices within audio memory 92, may, for example, be present as a random-access audio unit configured as a magnetic disk recorder/player designed to operate under computer control and to provide access to a large number of audio messages. Magnetic recording material in the shape of disks 15 inches in diameter, each being utilized to retain this information within concentric sectors located on a series of 128 tracks are utilized with the devices. Such devices may operate at two rotational speeds, a higher speed, for example about one revolution per 0.25 seconds, for accessing any given starting sector and a speed of about one revolution per 12 seconds for recordation and/or playback. These devices, for example, are marketed under the trade designation Instavox RA-12 by Education & Information Systems, Inc., Champagne, Ill. 61820. To access a particular portion at audio memory 92, computer 82 looks to audio index memory 88 to derive information as to starting track, starting sector and length of message expressed in numbers of sectors for submittal of such access data along linkage 94. Upon receipt of such command data, memory 92 serves to provide an audio output at line 96, while disk portion information is relayed to microcomputer 28 via an association represented by line 97. From this information, microcomputer 28 determines the time of termination of audio mode performance. Line 96 leads to a telephone interface circuit 98 functionally structured in somewhat identical manner as that described at 46 in conjunction with FIG. 1. Circuit 98 serves to convert the audio signal at line 96 to a telephone transmission compatible signal or audio telephonic signal at a conventional telephone two-wire linkage 100. To carry out such transmission, however, the interface circuit 98 is enabled from along three line bus 102 and a text mode functioning modem represented by block 104 is selectively deactivated under control of bus 106. Such deactivation serves to remove the carrier tone output of the modem 104 at telephone communication linkage 108 such that the telephone line is now silent for operation in an audio mode. At the termination of audio broadcast from memory 92, the modem 104 is reactivated to establish a carrier tone by control command of computer 82 and the system reenters a text mode wherein character data or signals as well as command signals are transmitted along telephone linkage 108 to the user terminal 10 (FIG. 1). Station 110 is present to provide a human intermediating function between facility 80 and the user terminal 10. In this regard, the operator at such facility is provided conventional telephone interactive audible communication through a headset or the like as represented by block 112 coupled to telephone interface 98 via line 114. Additionally, the host operator is provided a terminal 116 having a keyboard and screen readout and coupled to an input/output port of computer 82 via serial linkage represented by line 118. With the arrangement, for example, upon the request of a user at the terminal 10, an appropriate request signal will be submitted to the host operator through terminal 116 which may be answered by transmission of a predetermined operator acknowledge signal and a two-way telephone conversation then is established between stations 10 and 80. To establish this two-way communication link, as before, computer 82, operating through linkage 106, causes modem 104 to terminate its carrier tone. Additionally, the telephone interface 98 and headset 112 are enabled via line 102 and corresponding responses are effected at user terminal 10. The operator within station 110, may then provide aid to the user terminal 10. Of course, such conversation can be initiated by the operator at station 110 and such two-way telephonic communication can be terminated at the option of the operator at station 110 or the individual operating terminal 10.

Now considering the entire system, reference is made to both FIGS. 1 and 2. Normally, the operation of the host facility 80 and user terminal 10 is within a text mode wherein character type information and command signals are transmitted between the two facilities. Following a logging on procedure carried out by user terminal 10, the host facility 80 responds, usually by providing initial inquiries, calling for a user response at terminal 10. Upon the actuation of a proper keystroke requested by the host facility 80 of the user at terminal 10, audio information may be transmitted from telephone linkage 108 to telephone input linkage 18. In this regard, the host facility 80 removes the carrier tone generated through its modem 104 which is detected at direct connect modem 20 of user terminal 10 and communicated to microcomputer 28 via line 50. In response to such detection, microcomputer 28 disables direct connect modem 20 to establish direct telephone communication between telephone interface 98 of host facility 80 and telephone interface 46 of the user facility 10. The same form of linkage can be utilized to provide direct communication between an operator within station 110 of host facility 80 and the user at facility 10. In the latter regard, the user at terminal 10 speaks through microphone 14 to the operator at station 110 and hears communication from the latter operator through the loudspeaker of television receiver 16.

Figure 3A:
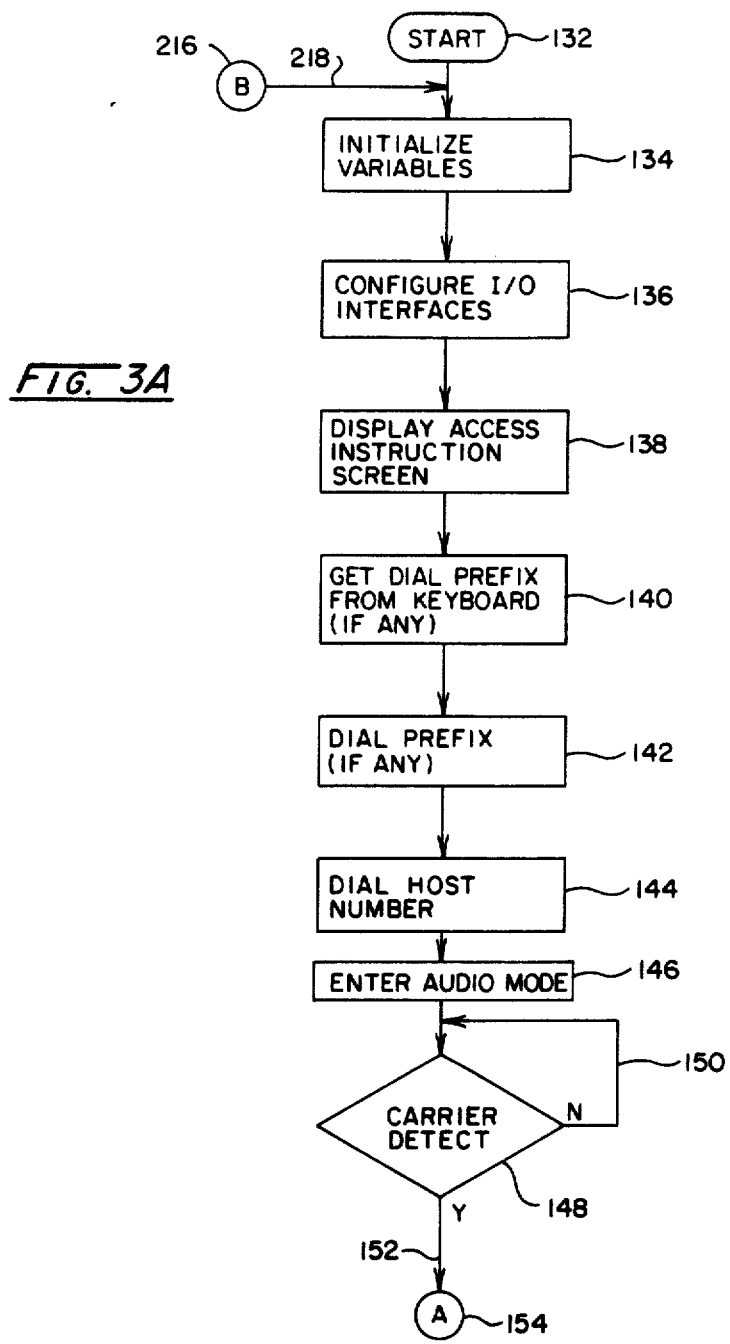
Figure 3C:
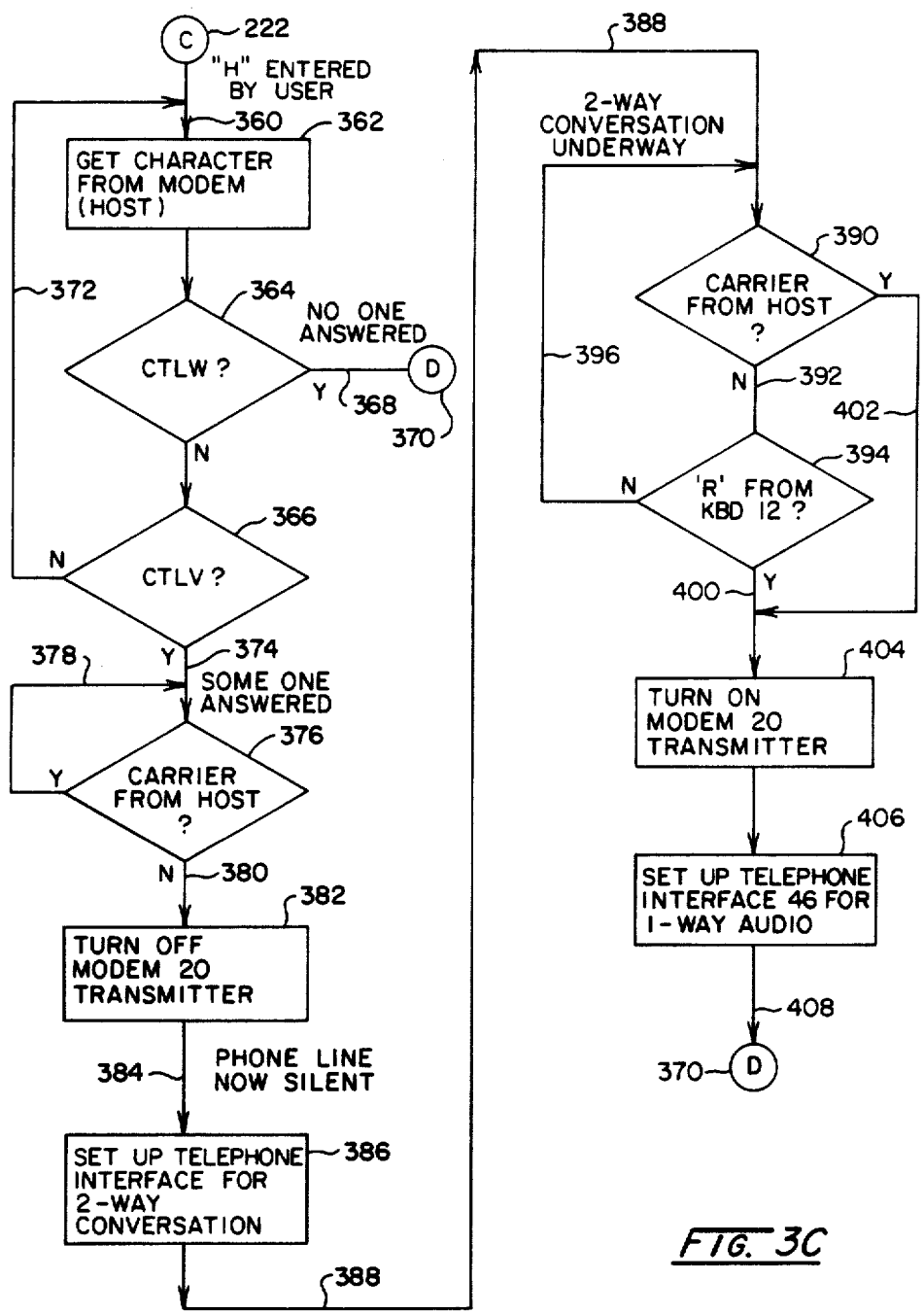

Referring to FIGS. 3A-3C, the control program for microcomputer 28 of user terminal 10 is generally described. Commencing with a start command, as represented at symbol 132, a conventional initialization function is carried out, as represented at block 134, whereupon, as represented at block 136, the input-output interface components are provided their initial configuration. Including such networks as described at block 24 in FIG. 1, the serial interface devices are, in and of themselves, programmable and receive initial information concerning baud rates, parity, the number of stop bit, interrupt data and the like. Such information corresponds with SYSGEN commands conventionally associated with mainframe computers. Following the interface configuration represented at block 136, as represented at block 138, the microcomputer 28 provides for the display of instructions for accessing host facility 80 from its own memory function. In this regard, the screen of television receiver 16 will indicate any dialing prefixes which are required to be inserted through keyboard 12 as well as information as to accessing any of a variety of host sources. As of this point in time, no communication is made with the host facility. Generally, the communication procedures including dialing to provice access to the host facility are carried out automatically in response to a singular keystroke on the part of the user, for example the return key may be actuated for the purpose. As represented at block 140, the program then looks to the presence of any prefix required as a preliminary to automatic dialing, for example, the user terminal 10 may be coupled within a ninth level telephone subsystem. Additionally, should actual keyboard dialing be required, such inputs would be received at this point in time. Looking to block 142, microcomputer 28, operating in conjunction with the telephone line interface function of direct connect modem 20, carries out the dialing of the prefix, followed by the dialing of the host number itself as represented by block 144. As indicated above, where the telephone number of the host is inserted from keyboard 12, then that number is dialed instead. Dialing is carried out by the microcomputer 28 through off-hook control line 68 following a selected delay, for example of about 2 seconds, to assure the presence of a dial tone. As another arrangement, the direct connect modem 20 may detect such dial tone and so signal the microcomputer 28 to commence dialing. Generally, the operator of terminal 10 has the option of hanging up, for example, by stroking the "X" key.

Immediately following the dialing procedure, as represented at block 146, the user terminal 10 enters an audio mode. In such mode, no carrier is produced by direct connect modem 20 and direct coupling is made between input telephone linkage 18 and telephone interface circuit 46. The latter circuit is enabled via line 47 to provide an audio signal at line 40 which is transmitted through RF modulator 38 to the loudspeaker of television receiver 16. By so entering the audio mode as represented at block 146, the user is permitted to listen to the progress of the call through the television receiver speaker, ie. the user hears the ring at the host facility 80 as well as the off-hook response thereof as represented by the host carrier tone. In the event of continuous ringing, then the user will be apprised that no communication has been made and if an incorrect number has been dialed, an incorrect party will be heard answering the telephone.

Following an entrance into the audio mode as represented at block 146, the program progresses to decision block 148 at which point a query as to whether a host carrier detect signal has been received is made. In this regard, the carrier detect signal will be generated by direct connect modem 20 and transmitted to microcomputer 28 as has been represented by line 50. In the event no carrier detect signal is received, as represented by loop 150, the user terminal 10 waits until such tone is received at line 18. In the event such tone is received, as represented by line 152, the program proceeds to the routine commenced at node A as represented at 154. It may be observed that, in view of the carrier detect requirement represented by decision block 148 and loop 150, the user terminal 10 may be operated as a conventional telephone, the system never progressing to text mode in the absence of a host carrier.

Referring to FIG. 3B, the program structuring text mode and audio mode performance on behalf of the user terminal 10 is illustrated. With the generation of a carrier tone on the part of the host facility 80 and the detection thereof as represented at block 148, the user terminal 10 control program enters into a text mode of operation as represented at block 156. In this regard, the microcomputer 28 disables the telephone interface 46 via command signals asserted through line 47. Additionally, the digital linkage between the user terminal 10 and host facility 80 is established by activation of modem 20 through appropriate commands asserted via the association represented by line 52. The host facility 20 also will be seen to carry out a corresponding disablement of telephone interface 98 and deactivation of modem 104 such that full duplex performance in conjunction with the carriers may be effected. Generally, the program may be arranged such that an initial portion of the received carrier tone at telephonic linkage 18 will be heard by the user through the loudspeaker of television receiver 16. This will give the user an audible indication of the establishment of communication with the host facility 80.

From the entry of the terminal control program into a text mode as represented at block 156, the program proceeds as represented at line 158 to query again whether a host carrier signal has been detected, as represented at decision block 160. At the commencement of a given interactive session, the answer with respect to the inquiry at block 160 will be yes and, accordingly, the program proceeds as represented by line 162 to an instruction represented at block 164 to wait for and obtain a character which has been transmitted to direct connect modem 20. One of two categories of characters may be received at this point, one being a displayable character, the other being a command signal present as a control code, for example BEL or CTLN (ASCII SO). It may be observed that the program at block 164 is one entirely slaved to host facility 80.

In the instant embodiment, the codes BEL and CTLN are utilized, in effect, as control characters. Accordingly, from block 164, the program progresses to decision block 166 at which location the query is made as to whether the received code is BEL. In the event that it is not, then as represented at line 168, the program progresses to an inquiry as to whether the received code is CTLN as represented at decision block 170. In the event that it is not, then as represented at line 172 the program progresses to a command to display the received textual character as represented at block 174. This received character then is displayed at the screen of television receiver 16 and the program loops, as represented at line 176 to line 158, whereupon, the query is made as to whether a carrier remains present as determined in conjunction with decision block 160. The necessary performance of the determination represented by block 160 becomes apparent at this juncture, inasmuch as the absence of a carrier at this position in the program represents that the program has been commanded by the host to enter an audio mode. In this regard, with a negative response to the query at block 160, as represented at line 178, the program branches to an audio mode routine commencing with the command to enter the audio mode as represented at block 180. In accordance with this command, direct connect modem 20 will be disabled by a signal represented as being asserted through line 52 and the telephone interface circuit 46 will be enabled via line 47 from microcomputer 28. The host facility 80 will perform functions corresponding to the above and audio information will be transmitted through the telephone linkage to the loudspeaker of television receiver 16. During the interval of this transmission of audio information, as represented a decision block 182 and loop 184, the system monitors telephone linkage 18 for the presence of a carrier from the host facility 80. At such time as the host carrier reappears, as represented at line 186, the user facility 10 re-enters a text mode as represented at block 188. The re-entry into a text mode then involves the disabling of telephone interface 46 via command from line 47 as well as the enabling of direct connect modem 20 via line 52. Following re-entry into a text mode, as represented by the path of lines 190 and 176, the program returns to line 158 whereupon a query as to the presence or absence of a carrier is again made as represented by decision block 160. Such return now assures that the re-entry into the text mode was not made in error.

It may be noticed that in the program thus far described, there is no provision for system response to entries made by the user through keyboard 12. While text is appearing on the screen and no control command signal from the host facility 80 has been received requesting a response, entries from keyboard 12 will be ignored such that the user of terminal 10 will not be able to interrupt host facility 80 transmission. In particular, the host facility 80 decides when it is desirable to read or obtain a single keyboard character and a determination to accept such character is made generally with a message to the user at terminal 10 to enter a selection through an appropriate stroking of a key within keyboard 12.

Returning to decision block 166, where host facility 80 transmits a command code, for example, BEL, in effect, the user will have been directed to transmit a request and the program will branch as represented by lines 192 and 194 to await an input from the user which is provided by proper actuation of the keyboard 12. This operational condition is represented at block 196. Note, that the program will progress no further until a proper character is received from the keyboard 12 and the query as to whether a "legal" or proper character has been produced is represented by decision block 198. The BEL command is transmitted by the host facility 80 at the termination of each page of text mode materials transmitted. This affords the user an opportunity to elect whether or not to continue the session to the next page of textual data. For the embodiment illustrated, proper request signal characters will be provided as a numerical index selection including numbers 1 through 9, additionally, a valid or legal character will be present as B, representing a desire to move the index selection rearwardly one page, an S representing an operator desire to start the program over again by returning to the top level of the index, by an H representing a request for help from the intermediary at the operator station 110 of host facility 80 or by an X, representing an exit or termination from the instant session. Any other character transmitted will be rejected by the program as represented by loop 200 extending from decision block 198 to line 192. In the event a proper or "legal" character is generated, then as represented at line 202 and block 204, the user terminal 10 transmits the acceptable carrier to the host facility 10. Because the host facility 80 generally reacts to transmitted characters as emanating from a keyboard, as represented at block 206 and in keeping with conventional practice, a carriage return, "CR" is automatically transmitted to the host facility.

The program then looks for a condition wherein two specific command characters will have been transmitted to host facility 80. Initially, as represented at decision block 208, the program looks for the transmission of the command character "H", representing a call by the operator for intermediary help. In the event that the inquiry at block 208 is in the negative, then as represented at line 210 and decision block 212, the program queries as to whether the transmitted command character was an "X". In the event that the determination at block 212 is in the affirmative, then as represented at line 218 leading to node "B" at 216, the program restarts as represented at the corresponding node and line 218 in FIG. 3A. Recalling the program at that figure, it may be observed that the user terminal 10 will reinitialize variables as represented at block 134 including a command to hang up asserted by microcomputer 28 through line 68 to direct connect modem 20. Upon hanging up the telephone connection, the access instruction screen is displayed as represented at block 138 and the user is invited by this instruction screen to commence telephonic access to the host facility 80.

In the event that the query posed in conjunction with decision block 208 indicates that the command character "H" has been sent, then the program enters a subroutine directed to this request for help as represented at line 220 leading to node 222. This subroutine is discussed later herein. Where a command code "CTLN" is received from host facility 80 as represented at decision block 170, then the program progresses, as represented by line 224, to block 226 at which position in the program, the microcomputer 28 awaits the receipt of a binary character which is intended to be submitted along line bus 56 to speech synthesizer circuit 54. The character will represent a number which, in turn, represents a word or portion thereof to be created by the synthesizer circuit 54. Accordingly, the next command within the program as represented at block 228 provides for the generation of the word commanded to be said by the host facility 80. Following the formation of the audible word, the routine, as represented at line 230, returns to commencement line 158.

Figure 4A:
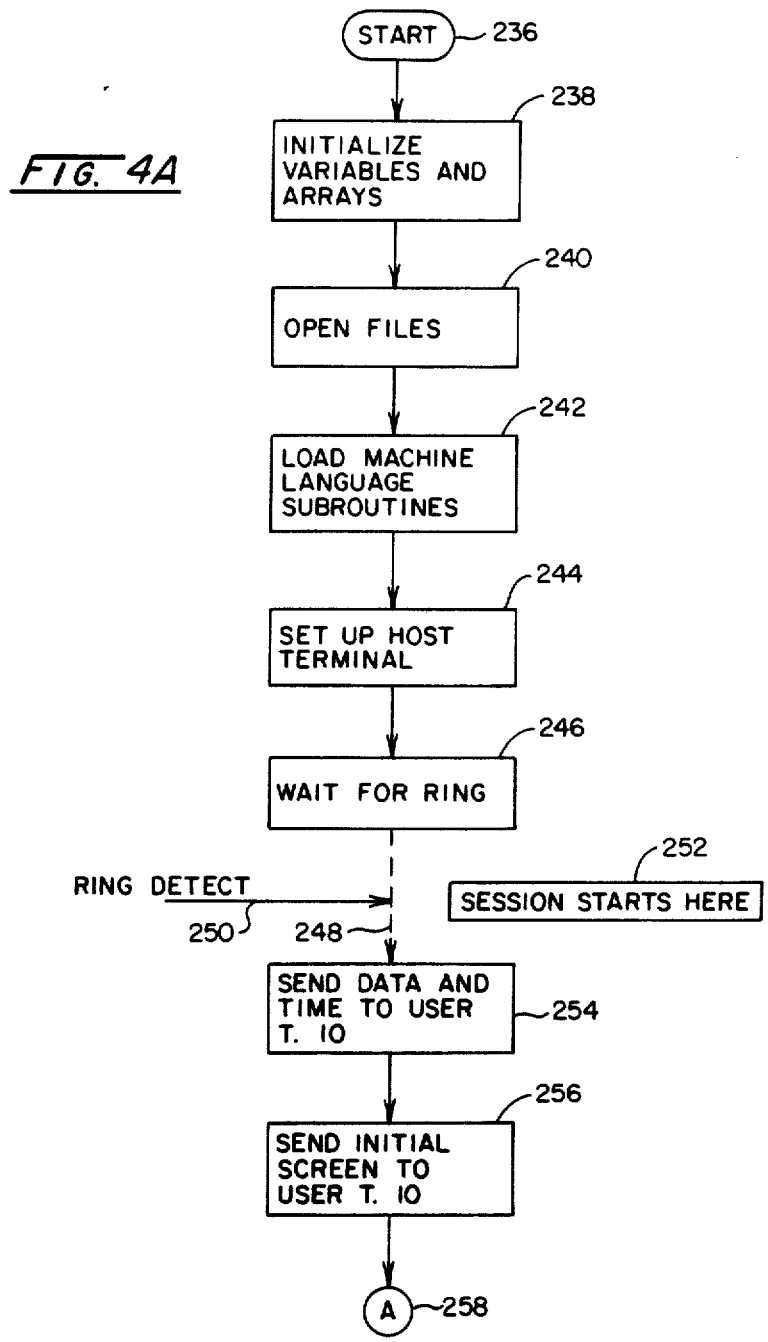
FIGS. 4A-4C show a flow chart describing the control program utilized in conjunction with the host facility represented at FIG. 2.
Figure 4B:
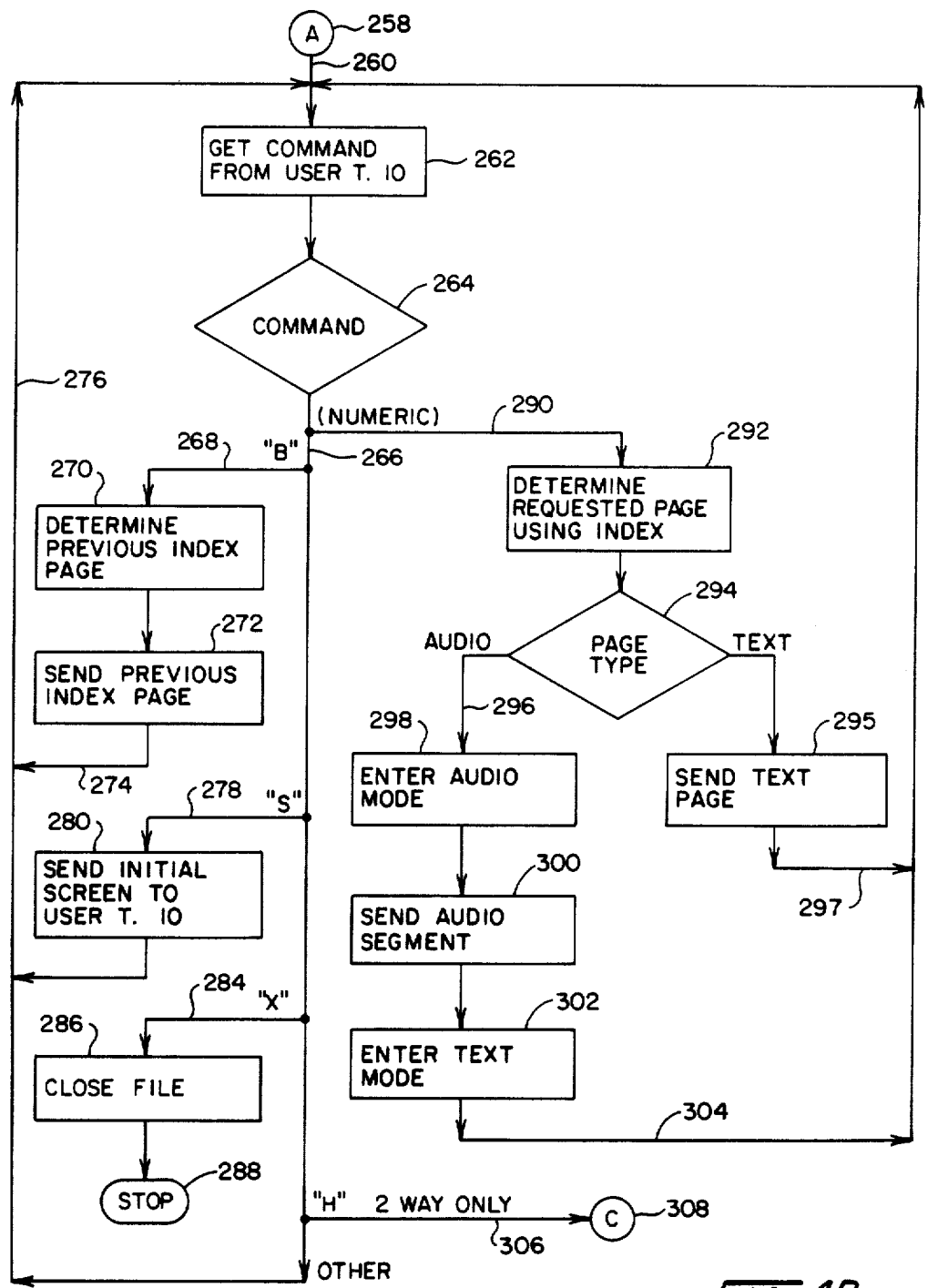

Referring to FIGS. 4A and 4B, a general representation of the control program of host computer 82 is provided. Following the start-up of facility 80 as represented at symbol 224, the program commences to initialize all variables and arrays as represented at block 226, a procedure common to computer operation. Following the initialization procedures as represented at block 226, the program commences to open appropriate files for providing access to the database for the services contemplated. This procedure is represented at block 228. Following the file arrangement procedures, the program progresses to a procedure wherein the control programs for special peripheral devices including audio devices and the like are entered or loaded for permitting a more rapid execution of specific programs. This procedure is represented at block 230. The program then commences to set up the host terminal or operator station as represented at block 232, such terminal being described in connection with FIG. 2 at boundary 110. Data such as providing input/output ports with baud rate, parity, stop bits, number of bits in the word and the like are submitted to the host terminal device in conjunction with this instruction. Following the setting up of the host, the program, in effect, assumes a rest state wherein it awaits a telephone ring or an inquiry from a user facility 10. This rest state is represented at block 246.

Host facility 80 will maintain this rest state until such time as its modem function 104 detects a ring at telephone linkage 108. Thus, the next line linkage with the program flow chart is represented by dashed line 248. Upon the detection of a telephone ringing signal from user facility 10, as represented by labeled line 250, an interactive session commences between user terminal 10 and host facility 80 as represented by labeled block 252.

With the commencement of an interactive session, the host facility 80 activates modem 104 to provide a carrier tone at telephone linkage 108 which is detected as represented at decision block 160 in FIG. 3B by the user terminal 10. With this carrier tone, as represented at block 154, initial information such as the date and time is transmitted by facility 80. The sytem is in a text mode of operation at this time and such data will be transmitted to the screen of television receiver 16. Additionally, verbal information as to date, time and the like preferably is transmitted in conjunction with a CTLN command code to provide for the operation of speech synthesizer 54. Host facility 80 additionally transmits an initial screen of textual information to the user terminal 10 as represented at block 256. This initial screen will contain a message welcoming the user to the host service and, usually, an initial, menu tree form of general category selection. Of course, the latter approach to indexing is not a requisite for the system, for example, access may be through key words or any of a variety of access approaches. At the termination of the transmisson of the characters representing the initial screen, the command code BEL, as described in conjunction with decision block 166 in FIG. 3B, is transmitted which requires a response from the user in terms of a keystroke electing the next step in the interactive session. The program is shown leading to node "A" at 258 which is reproduced at FIG. 4B.

Referring to FIG. 4B, node 258 is seen to commence a program routine along line 260 to block 262 at which position the host program awaits a command from user terminal 10. Recall in this regard from FIG. 3B that upon the transmisson of a BEL (ASCII 7) command, microcomputer 28 awaits the presence of a legal character generated by the user at keyboard 12 for transmission to host facility 80. Upon the election of such legal command such as the numbers 1-9, B, S, X, or H, on the part of the user at terminal 10, microcomputer 28 will effect the transmission of that character as represented at block 204 followed by carriage return, CR, as represented by block 206 to the host facility 80. Once such command character has been received, as represented by block 264, the received command will be treated by a select sub-routine depending upon the particular command transmitted in accompaniment with a carriage return character. Thus, if a "B" command is asserted, then looking to logic flow paths 266 an 268, the user request will be, in effect, to display the next preceding screen or to go "back" a page. Path 268 leads to block 270 wherein the previous index page is determined from the earlier opened files. Upon this determination, as represented at block 272, the previous page then is transmitted as represented at path 274 which leads, in turn, to loop 276 extending to path line 260. This previous page is transmitted by character and the earlier described BEL command code is transmitted at the end of each page which is sent.

Where an "S" command character is transmitted by the user from user terminal 10, then as represented by path 278 and block 280 the host facility 80 transmits the initial screen to the user terminal 10 and, in effect, starts the entire session over with the initial index screen. As before, at the termination of transmitting this page or screen, the BEL command character code is transmitted. As represented at path line 282 and loop 276 extending to path line 260, the host facility then awaits a next command from the user terminal 10.

In the event that the character "X" is transmitted by the user terminal 10, then as represented at path line 284 and block 286 the host files are closed and the session is terminated at the wish of the user. As indicated earlier herein in connection with FIGS. 3A and 3B, a user actuation of an "X" command character will cause an initialization of the user terminal along with a telephone hang-up and loss of user terminal modem carrier transmission. The host modem 104 detects this loss of carrier and reacts automatically through an appropriate carrier detect function to carry out a program reset as represented by node 288. The system reboots itself after closing the files and consequently re-enters the program from the top.

In the event that the command received from user terminal 10 is numeric, the the program follows the sub-routine path represented by line 290 leading to block 292. Block 292 establishes an instruction wherein the requested page represented by the numeric character is determined. These pages are provided in a first numeric sequence for audio mode performance and in a next different numerical sequence for text mode performance. Accordingly, when the requested page is determined, as represented by decision block 294, the particular page number requested is analyzed with respect to audio mode or text mode performance. As is apparent from the disposition of block 294, these modes are mutually exclusive. In the event a page identification corresponds with audio mode operation, then as represented at path line 296, the program enters an audio mode as represented at block 298. The audio mode provides for the disabling of modems 20 and 108 and clearing of telephone communication lines. Additionally, as indicated earlier herein in connection with FIG. 1, the telephone interface function 46 is enabled. When the audio mode is established, as represented at block 300, the selected audio segment is transmitted. Recall that the audio segment is identified or specified by track identification, sector identification, and length of sector which are tabulated appropriately. Following the transmission of the audio segment, the program re-enters text mode as represented by block 302. As the text mode is established, the program loops to line 260 as represented by loop line 304.

Returning to block 294, in the event that a page identification corresponds with text mode operation, then, as represented at block 295, a text page of character signals are transmitted. At the termination of transmission of the page, a BEL command code is transmitted. The program then returns, as represented by lines 297 and 304 to path line 260 and block 262.

In the event that an "H" command character is transmitted by the user at terminal 10, then the program branches as represented at path line 306 to node 308. It may be observed additionally, that any other command character which may occur but most probably will not, will loop via path line 276 to the input path line 260.

Node 308 represents the commencement of a sub-routine for calling upon the help of a human intermediary at the host facility 80.

Figure 4C:
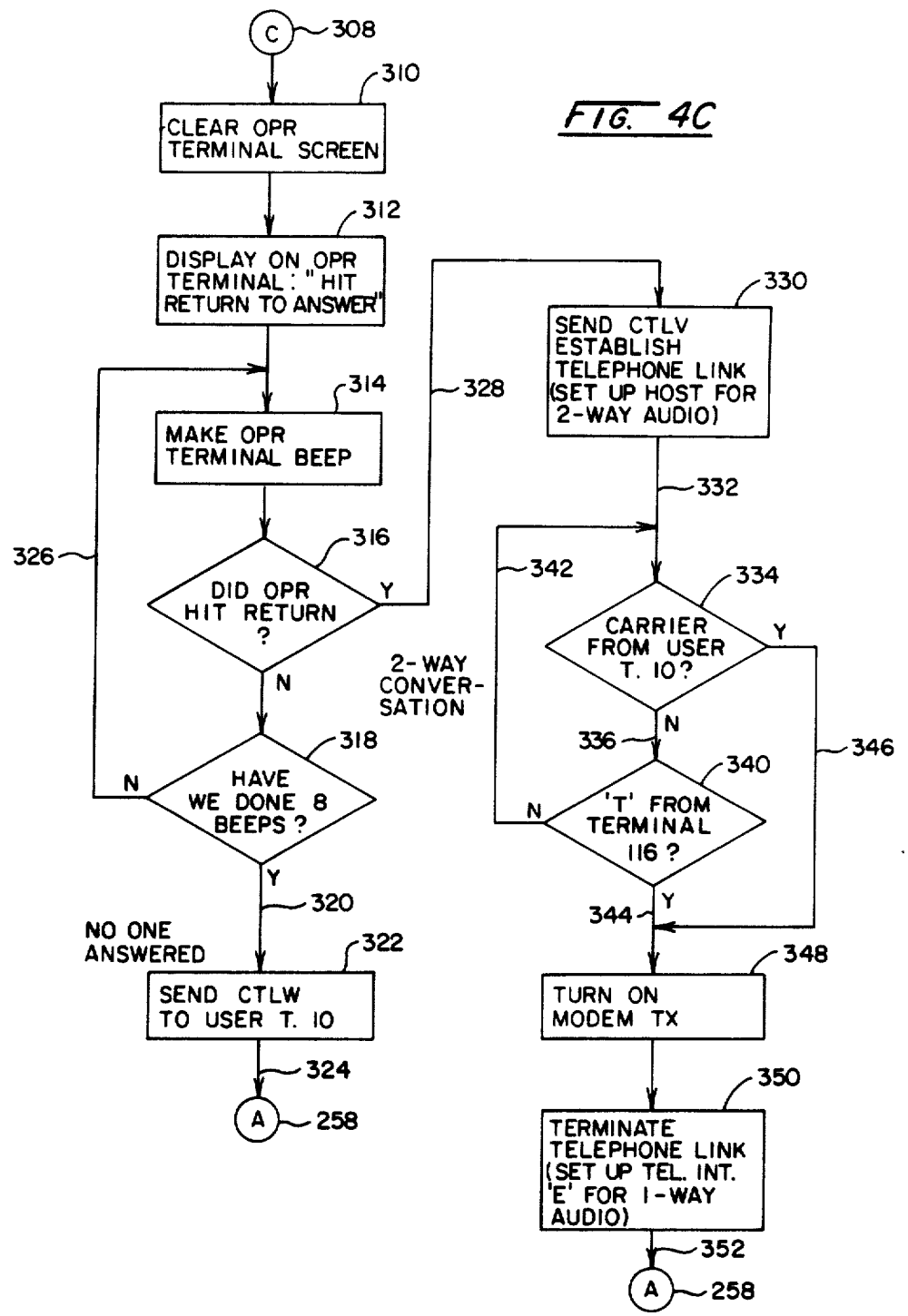

Referring to FIG. 4C, the node 308 is reproduced at the commencement of this sub-routine, the initial command of which is to clear the CRT screen associated with the terminal keyboard 116 of the host station 110. This command is represented at block 310. Upon clearing this screen, as represented at block 312, a display is provided at station 110 advising the operator to press the return key to answer the inquiry (a user terminal 10 transmitted "H"). Additionally, an intermittent audio alarm will sound for a given number of rings, for example, eight rings spaced at 1½ second intervals. The annunciation command is provided at block 314, while the monitoring of the host station 110 during the ringing activity is represented by decision block 316. Monitoring of ringing continues in conjunction with the command at block 316 until such time as the noted predetermined number of rings or "beeps", have occurred. Upon the termination of this predetermined number, as represented at decision block 318, and in the absence of an operator answer, the program continues as represented at path line 320. Line 320 leads to block 322 which provides for the transmission of no response signal command code CTLW to user facility 10. With the completion of this transmission, as represented at line 324, the sub-routine returns to node 258 which, as shown at FIG. 4B, provides for a status of awaiting a next command from user terminal 10 as represented at block 262.

The dwell or waiting interval during which ringing occurs at operator station 110 is represented by loop line 326. If during this interval, the operator at station 110 answers, for example, by pressing a return key, the computer follows the logic path represented by line 328 which, in turn, leads to block 330. The commands at block 330 provide for the transmission to the user terminal 10 of an operator acknowledge signal control code, CTLV, which signal, following the transmission of code character "H", provides an indication of the response of the operator at station 110. The host facility 80 additionally establishes a two-way telephone link with user terminal 10, such activities as disabling carrier transmission on the part of modem 104 being carried out as well as the enablement of telephone interface 98. The latter activity provides for the enabling of the headset 112 and the readout at terminal 116 of information advising the operator that the telephonic link has been enabled as well as instructions to the operator to actuate the "T" character to return the system to a text mode.

Following the establishment of the two-way telephone link, as represented at path line 332, the program progresses to a sub-routine provided to determine the point of termination of the two-way conversation. Such conversation will be terminated by the presence of a carrier generated by the user terminal 10 and the detection and determination of such an event is represented at decision block 334. In the event that the carrier from user terminal 10 is not detected, then the sub-routine proceeds in accordance with path line 336 to determine whether or not the command character "T" has been generated by the operator at station 110, such query being represented by decision block 340. In the event that the determination at block 340 is in the negative, then as represented by loop line 342 the sub-routine returns to path line 332. This looping activity continues while two-way conversation occurs between the user at terminal 10 and the operator at station 110.

Where the determination at decision block 340 is in the affirmative that a command character "T" has been developed, then as represented at path line 344 the program progresses to carry out the session termination procedures. As represented by loop line 346, this same activity is undertaken in the event that the query at decision block 334 is in the affirmative, ie. that a carrier tone has been detected from the user terminal 10. In the event that a termination of the session is indicated at line 344, then the program continues to activate the host carrier tone by enabling modem 104 as represented at block 348. Following the enablement of modem 104, as represented at block 350, appropriate shutting down of the telephone interface 98 of host facility 80 is carried out. In effect, this involves the setting up of the interface 98 to exhibit a one-way audio orientation. Such activities as disablement of the headset 112 microphone and appropriate system reconfiguration to a one-way system takes place. Following these restructuring procedures, the program progresses as represented by line 352 to node 258 which, as represented at FIG. 4B, leads to block 262 wherein the host awaits a next command from user terminal 10.

Turning now to FIG. 3C, node 222 as described in connection with FIG. 3B is reproduced. This node follows an affirmative determination from decision block 208 of that figure that the user at terminal 10 has entered a command character "H" requesting help from the intermediary at station 110. It may be recalled that with this activity, the read-out at station 110 is requesting that the operator answer an intermittent ring by actuating a carriage return or other appropriate key at terminal keyboard 116. In consonance with this activity, the decoder program enters a logic arrangement represented by path line 360 leading from node 222 to block 362. At block 362, the user terminal 10 is shown to await the receipt of an appropriate command code from host facility 80. In this regard the command code received will be either a CTLW a no response signal representing that the operator is not available or a CTLV, an operator acknowledge signal representing that the operator has responded with the noted carriage return signal or the like. This logic is represented at decision blocks 364 and 366. Block 364 poses the query as to whether CTLW has been received, and in the event of an affirmative answer, as represented at line 368, the program follows a logic represented at node 370 which is reproduced in FIG. 3B as leading to block 196 from line 194 which, in turn, represents a command to await a next character from the user terminal 10 keyboard. A negative answer to the query at block 364 leads to block 366 which represents a query is made as to whether command CTLV has been received which would represent an answer on the part of the operator station 110. A negative response results in a looping as represented at line 372 causing the program to await such response, while an affirmative response to the query at block 366 as represented at line 374 represents that the operator at station 110 has responded to the call. The program then progresses to the query at decision block 376 at which position determination as to whether the carrier tone from modem 104 has been turned off. If this is not the case, then the host side of the telephone interlinkage is not prepared for conversation and a pause is interposed as represented by loop line 378 until such condition is present. Such condition is represented by a negative response at line 380 which leads to the disabling of modem 20 by user terminal 10 as represented at block 382. The control path then continues as represented at line 384 to block 386 at which position, the telephone interface 46 is enabled. Within the interval represented by line 384, the telephone linkage between user terminal 10 and host facility 80 is silenced to permit normal telephonic conversation to ensue. Upon setting up the telephone interface as represented at block 386, a "hands free" conversation may take place between the operator at host facility 80 and the user at user terminal 10.

During this conversation, the user facility program 10 loops in a stand-by condition awaiting termination either by virtue of activity on the part of the operator at station 110 or on the part of the user at terminal 10. In this regard, it may be observed that the program progresses from block 386 along line 388 to decision block 390. At block 390, the presence of a carrier tone from host facility 80 is determined. If such carrier tone is not present, then as represented at line 392, the program progresses to an inquiry at block 394 to determine whether or not the user at facility 10 has actuated keyboard 12 to produce a Resume command character "R" calling for resumption of text mode operation. Where this is not the case, then as represented by loop line 396, the program returns to line 388, two-way conversation continuing. Where the inquiry at block 394 provides an affirmative response, then as represented by line 400, the program commences to terminate the audio mode operation. Similarly, where a carrier is detected from host facility 80 as represented at decision block 390, then as illustrated by loop line 402 leading to line 400, termination activities similarly will ensue. Looking to these activities, as represented at block 404 the carrier tone transmission of modem 20 is activated and, as represented at block 406, telephone interface 46 is reconfigured for later one-way audio performance, microphone 14 being disabled and the like. Following the activities as represented at block 406, the program continues, as represented by line 408, to node 370 which enters the operational program as described in conjunction with FIG. 3B at that same node.

Figure 5A:
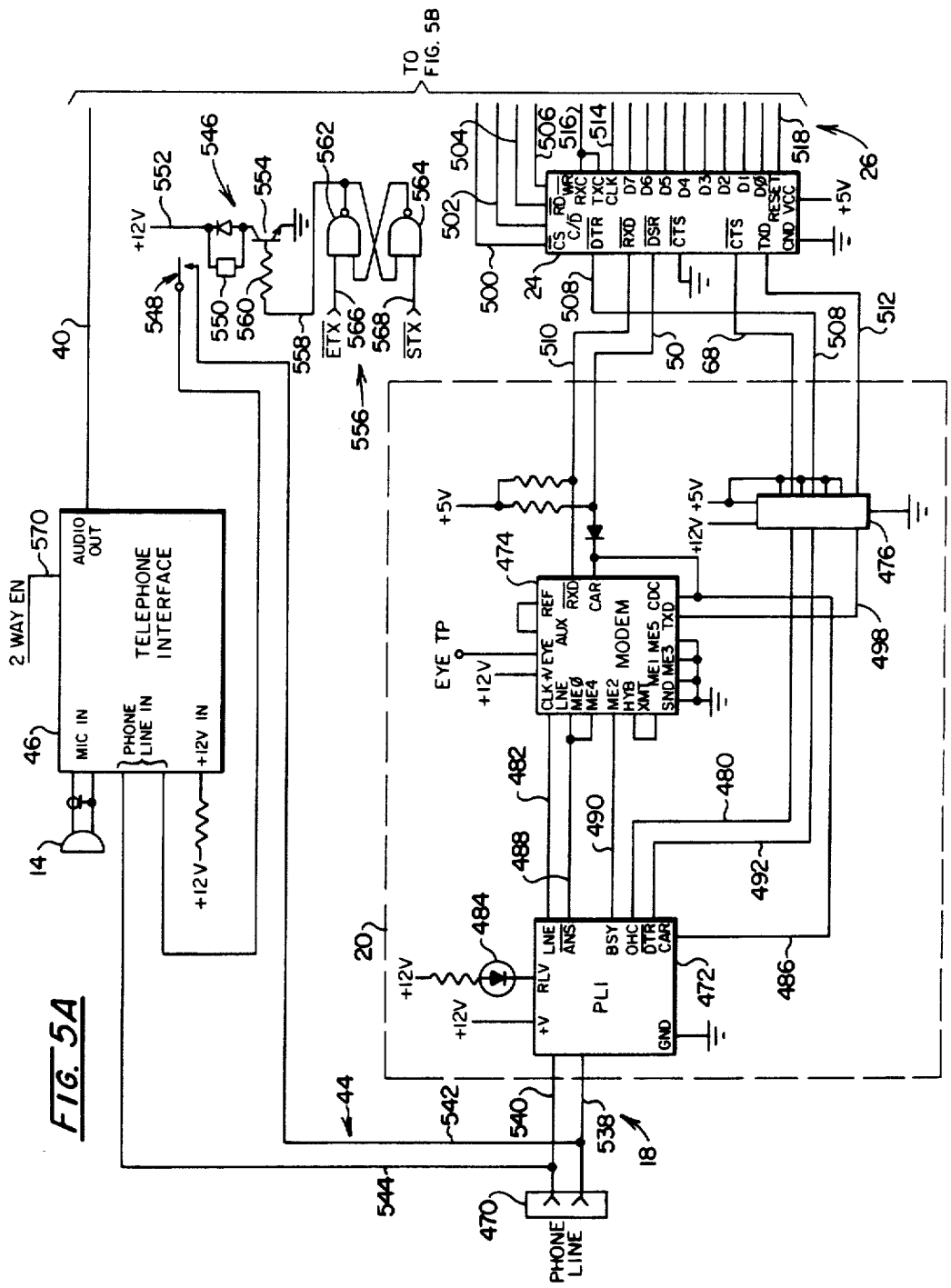

Referring to FIGS. 5A and 5B, a more elaborate schematic illustration of the user station 10 is provided. These figures should be considered together in respective left and right mutual adjacency as shown in FIG. 6.

Looking to FIG. 5A, the two-wire telephone input again is represented in general 18 in conjunction with a conventional RF-11 telephone jack are illustrated as introduced to direct connect modem 20 now shown as a dashed boundary. Direct connect modem 20 includes a telephone line interface circuit (PLI) 472 which operates in conjunction with a modem circuit 474 and a level shifter 476. Each of the components 472 and 474 are marketed, for example, by Novation, Inc., Tarzana, Calif. 91356. Level shifters as at 476 are marketed, for example, by Texas Instruments Corp., Dallas, Tex.

Coupled to the tip and ring lines 18 of the telephone linkage, telephone line interface 472 includes an on-hook control OHC terminal coupled to line 480 which carries out such functions as developing an on-hook and off-hook status to establish telephone communication as well as to carry out automatic pulse method dialing. Interface 472 further serves as an impedance matcher and interface device to the phone line and transmits treated telephone signals to modem 474 through line 482. During periods of off-hook status, the interface 472 serves to effect the energization of an LED 484 which is coupled between +12 v power supply and the relay control output terminal, $\overline{RLY}$. Carrier detection performance is provided at line 486 extending between the CAR terminal of interface 472 to the corresponding terminal as well as terminal CDC of modem 474. Answer control is provided at the $\overline{ANS}$ terminal and line 488 extending to modem 474. Generally, this terminal serves in control of modem answer and originate modes. The busy control input of the PLI 472 is provided at the BSY terminal thereof which is coupled with line 490 to modem 474, while the data terminal ready input terminal $\overline{DTR}$ is coupled through line 492 to level shifter 476.

Modem 474 is operationally associated with programable communication interface 24 both by direct connection and through level shifter 476. Interface 24, may be provided, for example, as a type 8251A interface marketed by Intel Corp., Santa Clara, Calif. 95051, the circuit thereof is used for accepting data characters from microcomputer 28 in parallel format and then convert them into a continuous serial data stream for transmission. Simultaneously, the circuit can receive serial data streams and convert them into parallel data characters for microcomputer 28. Generally, the device is constructed using N-channel silicon gate technology.

Control over interface 24 is provided by a chip select, $\overline{CS}$ terminal coupled through line 500 to the A1 address terminal of microcomputer 28; a control/data terminal $C/\overline{D}$ for selecting status or data input conditions which is coupled via line 502 to address terminal A0 of the microcomputer; a read terminal, $\overline{RD}$ coupled through line 504 to the corresponding terminal of the microcomputer; and a write terminal, $\overline{WR}$, coupled through line 506 to the corresponding terminal of the microcomputer.

The data terminal ready, $\overline{DTR}$, of interface circuit 24 is coupled by line 508 to level shifter 476 and thence to the corresponding terminal of interface 472 from line 492, while the receiver data terminal, R×D, is coupled via line 510 to the corresponding terminal of modem 474. Similarly, the data set ready, $\overline{DSR}$, terminal of interface 24 is coupled through earlier-described line 50 to the carrier detect output terminal, CAR, of the modem 474. This $\overline{DSR}$ terminal serves to receive carrier detect information. The ready to send, $\overline{RTS}$, terminal of interface 24 is coupled through line 68 and level shifter 476 to corresponding line 480 which extends to telephone line interface circuit 472. Information at line 68 serves the earlier-described off-hook control function. A transmit data terminal, TxD, is coupled through line 512 to level shifter 476 and thence via line 498 to the corresponding terminal of modem 474. Parallel characters sent by microcomputer 28 are transmitted serially through the TxD terminal.

Parallel data exchange between interface 24 and microprocessor 28 is carried out along bus 26 which mutually couples data terminals D0–D7 of these components. The clock terminal, CLK, of microcomputer 28 is coupled to the corresponding terminal of interface 20 via line 514. Signals at the latter line provide a system clock signal utilized in conjunction with the execution of instructions and the synchronization of the control terminals to interface 24. Correspondingly, the TO terminal of microcomputer 28 is coupled via line 516 to the corresponding receiver clock and transmitter clock terminals, RxC and $\overline{TxC}$, of interface 24 to establish baud rates for the system. Resetting of interface 24 is carried out by microcomputer 28 operating through line 518. The microcomputer 28, in turn, may be manually reset from line 520 coupled to the midpoint of an RC network 522 and reset switch 524. With the arrangement, upon bringing power on to the system, capacitor 526 gradually will be charged through resistor 528 over an interval of time selected to provide a reset signal. Thus, a system reset is generated at each power on condition. Closing switch 524 discharges capacitor 526; when the switch is released, capacitor 526 recharges gradually through resistor 528, causing a system reset. This serves to commence the microcomputer program at all proper zero locations.

FIG. 5B reveals that speech synthesizer 54 is coupled through 8-bit parallel bus 56 to the parallel output ports PB0–PB7 of microcomputer 28. Synthesizer 54 is strobed from along line 530 and provides a "busy line" signal to microcomputer 28 from along line 532. The output of synthesizer 54 is provided at line 58 which extends through a resistor network 534 to telephone interface output line 40. Resistor network 534 is provided to properly mix the audio output at line 58 with the corresponding telephone audio output at line 40. Line 40, in turn, leads to the "AUDIO IN" port of RF modulator 38. Audio amplifier 62 is coupled to receive the audio signals at line 40 through line 534 which includes a combined power and volume control potentiometer represented generally at 536.

Video input to RF modulator 38 is, as before, asserted from line 36 which is coupled to the VIDEO output terminal of video circuit 34. Circuit 34 is controlled from and receives parallel data from microcomputer 28 from the PA0–PA7 output port components thereof extending through bus 32 to the corresponding input ports K10–K16 and strobe port $\overline{STB}$. Circuit 34 also contains output terminals labeled $\overline{BEL}$, $\overline{STX}$, $\overline{ETX}$, $\overline{RFMOFF}$ and $\overline{RFMON}$, which are controllable from the PA0–PA7 ports of microcomputer 28. These ports are used for control purposes within other regions of the terminal 10 circuit. For example, the $\overline{BEL}$ terminal of circuit 34 is coupled to line 530 which serves to strobe speech generator circuit 54.

It may be recalled that the two-line telephone input at 18 is tapped to provide a telephone input 44 to telephone interface 46. The tip and ring telephone inputs at 18 are represented by lines 538 and 540 which, in turn, are tapped by respective lines 542 and 544 for submission to the input terminals of interface 46. Enablement of this input to interface 46, however, is controlled by a mode relay network revealed generally at 546 as selectively switching line 542. In this regard, a normally open reed-relay switch, the times of which are represented at 548 is inserted within line 542 and is selectively actuated by electromagnet 550. Electromagnet 550 is coupled between line 552 carrying +12 v and an NPN transistor 554, the collector of which is coupled to one side of electromagnet 550, while the emitter thereof is coupled to ground and the base is connected to the output of cross coupled R-S latch 556 through line 558 including base resistor 560. Latch 556 is comprised of two NAND gates 562 and 564. A control input to gate 562 is provided at line 566 which is shown carrying an $\overline{ETX}$ signal. Correspondingly, the control input to gate 564 is provided at line 568 and is shown carrying an $\overline{STX}$ signal. With the arrangement shown, a low going pulse presented at line 566 will cause the output of latch 556 to assume and retain a logic high state. This high state at line 558 turns transistor 554 on to continuously energize electromagnet 550 and close switch 548. This serves to enable or couple the telephone input to telephone interface 46. Conversely, a low going pulse asserted at line 568 will cause the output of latch 556 to assume and retain a logic low condition which, in turn, retains transistor 554 in an off condition to de-energize electromagnet 550 and effect the opening of switch 548. The $\overline{ETX}$ and $\overline{STX}$ signals at lines 566 and 568 are provided at the corresponding terminal outputs of video circuit 34 and are evolved upon appropriate command asserted from microcomputer 28 through bus 32.

Telephone interface circuit 46 also is enabled to carry out two-way telephone conversation, inter alia, by the enablement of microphone 14 through a signal asserted at line 570. This signal at line 570 also is generated from video circuit 34. In this regard, the read from memory output terminals, $\overline{RFMON}$ and $\overline{RFMOFF}$, are selectively controlled to provide pulsed signals at respective lines 572 and 574. These lines lead to the control inputs of another cross-coupled R-S latch represented generally at 576 and having an output at line 570 leading to telephone interface 46 as described above. Latch 576 is configured in conventional fashion as including two cross-coupled NAND gates 578 and 580, the control inputs to which are respective lines 572 and 574.

Since certain changes may be made in the above-described system and apparatus without departing from the scope of the invention herein involved, it is intended that all matter contained in the description thereof or shown in the accompanying drawings shall be interpreted as illustrative and not in a limiting sense.

I claim:

1. A system for providing interactive information exchange by telephonic linkage between a host facility and a user terminal, comprising:
    a host facility including:
    a host computer under the control of a host program for operating alternatively in a text mode and an audio mode, and having a text memory for retaining textual information and an audio mode index memory for deriving audio indexing signals;
    host modem means operatively associated between said host computer and said telephonic linkage and selectively enabled to assert a host carrier tone upon said linkage to effect the transmission thereupon of textual data selected from said text memory;
    audio memory means retaining a collection of recorded audio information and actuable in response to said audio indexing signals of said host computer derived from said audio mode index memory for generating an interval of select audio signals corresponding with select components of said collection at an output thereof;
    host telephone interface means coupled intermediate said telephonic linkage and said audio memory means output, actuable by said host computer for effecting the transmission of said audio signals as audio telephonic signals over said telephonic linkage during said audio mode;
    a user terminal comprising:
    terminal computer means under the control of a terminal program for operating alternatively in a text mode and an audio mode;
    key means coupled with said terminal computer means and manually actuable to transmit character signals thereto;
    terminal modem means operatively associated between said terminal computer means and said telephonic linkage, actuable to selectively assert a terminal carrier tone upon said linkage to effect the transmission thereupon of said character signals and responsive to the presence of a said host carrier tone to provide a carrier detect signal;
    terminal telephone interface means coupled with said telephonic linkage and enabled under the control of said terminal computer means during an audio mode thereof to receive transmitted said audio telephonic signals and convert them to audio signals;
    said terminal computer means being responsive to said carrier detect signal when said terminal program is in said audio mode for removing said telephone interface enablement and for actuating said terminal modem means to effect assertion of said terminal carrier tone upon said telephonic linkage, and being responsive to a termination of said carrier detect signal when said terminal program is in said text mode for enabling said terminal telephone interface, to actuating said terminal modem means to effect removal of said terminal carrier tone, and for effecting entry of said terminal program into said audio mode; and
    readout means responsive to said terminal computer means and said terminal telephone interface means for displaying transmitted said textual data during said text mode and for generating audible signals in response to said terminal telephone interface audio signals during said audio mode.

2. The system of claim 1 in which:
    said terminal modem means includes telephone dialing means responsive to said terminal computer means actuation for telephonically accessing said host modem means; and
    said terminal computer means program is configured to enter said audio mode during said telephonic access.

3. The system of claim 1 in which:
    said host computer program is configured for effecting the telephonic transmission by said host modem means of a predetermined command code during said text mode at the termination of transmission of a screen of said textual data; and
    said terminal computer means program is configured for effecting the transmission by said terminal modem means of only predetermined said key means derived character signals in response to terminal modem means receipt of said predetermined command code.

4. The system of claim 3 in which said host computer program is configured, when in said text mode, for response to select said key means derived character signals to enter said audio mode, to access said audio index memory to derive said audio indexing signals corresponding with said select key means derived character signals, said host computer conveying said audio indexing signals to actuate said audio memory means and said host telephone interface means and to effect removal of said host modem means enablement.

5. The system of claim 4 in which:
said audio memory means is responsive at the termination of an audio signal generation corresponding with said conveyed audio indexing signals for generating a completion signal; and
said host computer is responsive to said completion signal for re-entering said text mode, removing said host telephone interface means actuation, and enabling said host modem means to assert said host carrier tone.

6. The system of claim 1 in which:
said host computer program is configured for effecting the telephonic transmission by said host modem of a predetermined command code during said text mode at the termination of transmission of a screen of said textual data;
said terminal means modem means includes telephone dialing means responsive to said terminal computer means actuation for telephonically accessing said host modem means; and
said terminal computer means program is configured to enter said audio mode during said telephonic access, to effect the transmission by said terminal modem means of only predetermined said key means derived character signals in response to terminal modem means receipt of said predetermined command code.

7. The system of claim 1 in which:
said host computer program is configured for effecting the telephonic transmission by said host modem of a predetermined proceed code during said text mode at the termination of transmission of a screen of said textual data.

8. The system of claim 7 in which said host computer program is configured, when in said text mode, for response to select said key means derived character signals to enter said audio mode, to access said audio index memory to derive said indexing signals corresponding with said select key means derived character signals, said host computer conveying said indexing signals to actuate said audio memory means and said host telephone interface means and to effect removal of said host modem means enablement.

9. The system of claim 1 in which said readout means comprises:
video circuit means responsive to said terminal computer means for generating video signals at an output thereof corresponding with said transmitted textual data during said text mode; and
R.F. modulator means having an output connectable with the antenna input of a television receiver and responsive to modulate said video signals with a select carrier for effecting imaging by said television receiver and to transmit said audio signals to said input.

10. The system of claim 1 in which:
said user terminal includes:
speech synthesizer means coupled with said terminal computer means and responsive to predetermined binary coded speech signals asserted therefrom for producing audio signals at an output thereof; and
transducer means connectable with said speech synthesizer means output for converting said audio signals into perceptible audible sound.

11. A system for providing interactive information exchange by telephonic linkage between a host facility and a user terminal comprising:
a user terminal including:
terminal modem means coupled with said telephonic linkage and selectively actuable to assert and remove a terminal carrier tone, for the transmission of request signals and for the reception of textual character and command signals over said linkage;
terminal telephone interface means coupled with said telephonic linkage, selectively actuable for receiving telephonic audio signals and converting them to audio signals and for transmitting telephonic audio signals corresponding with user terminal derived audio signals asserted at a select input thereof;
microphone means coupled with said terminal telephone interface select input for generating said user terminal derived audio signals from user speech, when enabled;
user terminal key means manually actuable for generating said request signals;
readout means having input means for receiving textual character signals conveyed thereto for displaying readable characters corresponding therewith and for receiving conveyed said audio signals for generating audible signals corresponding thereto;
terminal computer means under the control of a terminal program operating in a text mode and an interactive audio mode, responsive to a said textual character signal when in said text mode for effecting the conveyance thereof to said readout means input means, responsive to a said command signal when in said text mode for effecting the said transmission of a said request signal generated by said terminal key means, one available said request signal being a request signal for textual information in the form of said textual character signals, another available said request signal being an interactive audio communication request signal, responsive to an operator acknowledge signal received at said terminal modem means subsequent to transmission of a said interactive audio communication request signal for actuating said terminal modem means to remove said terminal carrier tone, to actuate said terminal telephone interface means and to enable said microphone means;
a host facility including:
host modem means coupled with said telephone linkage for transmitting signals thereupon and receiving signals therefrom and actuable to selectively assert a host carrier tone upon said linkage and remove it therefrom;
host telephone interface means coupled with said telephonic linkage for communicatively receiving and transmitting audio telephonic signals thereover and selectively actuable to effect said communication;
operator station means including interactive audible communication means operatively associated with said host telephone interface means and actuable for enabling verbal communication therethrough on the part of an operator stationed thereat, and terminal means including readout means having an input for receiving and displaying character signals and operator key means manually actuable for transmitting a predetermined answer signal including said operator acknowledge signal, and an interactive audio mode termination signal;
a host computer under the control of a host program, having a text memory for retaining textual information, for operating in a text mode and an interactive audio mode, coupled with said host telephone interface means, said host modem means and said operator station means terminal means, operative when in said text mode in response to said interactive audio communication signal and said operator acknowledge signal to assume said interactive audio mode wherein said host modem means is actuated to remove said host carrier tone, said host telephone interface means is actuated and said operator station means is actuated, said host program being responsive to said interactive audio mode termination signal for actuating said host modem means to assert said host carrier tone and re-enter said text mode for accessing select said text memory retained textual information in response to transmitted said request signals and for effecting the transmission of said select textual information from said host modem means as said textual character signals.

12. The system of claim 11 in which:
said host computer program is configured for effecting the transmission by said host modem means of a no response signal subsequent to said response to said interactive audio communication signal in the absence of said operator acknowledge signal; and
said terminal computer means is responsive to said transmitted no response signal as a said command signal to remain within said text mode.

13. The system of claim 11 in which said terminal computer means is responsive to said operator acknowledge signal received at said terminal modem means and to a subsequent said actuation of said host modem means removing said host carrier tone to effect said actuation of said terminal modem means to remove said terminal carrier tone.

14. The system of claim 11 in which said host computer is responsive, when in said interactive audio mode, to a said assertion of said terminal carrier tone to re-enter said text mode and effect actuation of said host modem means to assert said host carrier tone upon said linkage.

15. The system of claim 11 in which said host computer is responsive, when in said interactive audio mode, to a said operator station means terminal means key means interactive audio mode termination signal for effecting actuation of said host modem means to assert said host carrier tone upon said linkage.

16. The system of claim 11 in which:
said user terminal key means is configured for generating a said request signal as an interactive audio mode user termination signal; and
said terminal program is configured for response to said interactive audio mode user termination signal for effecting actuation of said terminal modem means to assert said terminal carrier tone upon said linkage.

17. The system of claim 16 in which said host computer is responsive, when in said interactive audio mode, to a said assertion of said terminal carrier tone to re-enter said text mode and effect actuation of said host modem means to assert said host carrier tone upon said linkage.

18. The system of claim 16 in which said terminal program is configured for response to the actuation of said terminal modem means, when in said interactive audio mode, to effect the assertion of said terminal carrier tone, to remove said enablement of said microphone means and to effect the transmission of a subsequent said request signal by said terminal modem means.

19. The system of claim 16 in which said host computer is configured for response, when in said interactive audio mode, to the assertion upon said telephone linkage of said terminal carrier tone by said terminal modem means to re-enter said text mode.

20. The system of claim 11 in which:
said terminal computer means is responsive to said operator acknowledge signal received at said terminal modem means and to a subsequent said actuation of said host modem means removing said host carrier tone to effect said actuation of said terminal modem means to remove said terminal carrier tone; and
said host computer is responsive, when in said interactive audio mode, to a said assertion of said terminal carrier tone to re-enter said text mode and effect actuation of said host modem means to assert said host carrier tone upon said linkage.

21. The system of claim 11 in which:
said host computer is responsive, when in said interactive audio mode, to a said operator station means terminal means key means interactive audio mode termination signal for effecting actuation of said host modem means to assert said host carrier tone upon said linkage;
said user terminal key means is configured for generating a said request signal as an interactive audio mode user termination signal; and
said terminal program is configured for effecting response to said interactive audio mode user termination signal for effecting actuation of said terminal modem means to assert said terminal carrier tone upon said linkage.

22. The system of claim 21 in which:
said host computer program is configured for effecting the transmission by said host modem means of a no response signal subsequent to said response to said interactive audio communication signal in the absence of said operator acknowledge signal; and
said terminal computer means is responsive to said transmitted no response signal as a said command signal to remain within said text mode.

23. A system for providing interactive information exchange by telephonic linkage between a host facility and a user terminal, comprising:
a user terminal including:
terminal modem means coupled with said telephonic linkage and selectively actuable to assert and remove a terminal carrier tone, operative to effect the transmission of request signals and for the reception of textual character and command signals in conjunction with the presence of a host carrier tone;
terminal telephone interface means coupled with said telephonic linkage, selectively actuable for receiving telephonic audio signals and converting them to audio signals and for transmitting telephonic audio signals corresponding with user terminal derived audio signals asserted at a select input thereof;
microphone means coupled with said terminal telephone interface select input for transmitting said user terminal derived audio signals from user speech, when enabled;
user terminal key means manually actuable for generating said request signals;

readout means having input means for receiving textual character signals conveyed thereto for displaying readable characters corresponding therewith and for receiving said audio signals conveyed thereto from said terminal telephonic interface means for generating audible signals corresponding thereto;

terminal computer means under the control of a terminal program operating in a text mode, an interactive audio mode and an audio mode, responsive to a said textual character signal when in said text mode for effecting the conveyance thereof to said readout means input means, responsive to a said command signal when in said text mode for effecting the said transmission of a said request signal generated by said terminal key means, one available said request signal being a request for textual information in the form of said textual character signals, another available said request signal being an interactive audio communication request signal, responsive to an operator acknowledge signal received at said terminal modem means subsequent to a said interactive audio communication request signal for actuating said terminal modem means to remove said terminal carrier tone, to actuate said terminal telephone interface means and to enable said microphone means, responsive to the absence of said host carrier tone at said terminal modem means when in said text mode for actuating said terminal telephone interface means for enabling said microphone means and for actuating said terminal modem means to remove said terminal carrier tone; and a host facility including:

host modem means coupled with said telephonic linkage for transmitting said textual character and command signals thereupon in conjunction with said host carrier tone and for receiving said request signals in conjunction with said terminal carrier tone and actuable to selectively assert said host carrier tone upon said linkage and remove it therefrom;

host telephone interface means coupled with said telephonic linkage, selectively actuable for enabling a first input providing interactive telephonic communication over said linkage, and for receiving audio signals at a second input and effecting the transmission thereof as audio telephonic signals over said linkage;

audio memory means retaining a collection of recorded audio information and having an output coupled with said host telephone interface means second input and responsive to indexing signals derived from an audio mode index memory for transmitting an interval of select audio signals corresponding with select components of said collection to said second input;

operator station means including interactive audible communication means coupled with said host telephone interface means first input and actuable for enabling verbal communication therethrough on the part of an operator stationed thereat, and further including terminal means having readout means including an input for receiving and displaying character signals and operator key means manually actuable for transmitting a predetermined answer signal including said operator acknowledge signal and an interactive audio mode termination signal;

a host computer under the control of a host program for operating in a text mode, an interactive audio mode and an audio mode, having a text memory for retaining textual information and said audio mode index memory, coupled with said host telephone interface means, said host modem means, said audio memory means and said operator station means terminal means, operative when in said text mode in response to said interactive audio communication signal received at said host modem means and said operator acknowledge signal to assume said interactive audio mode wherein said host modem means is actuated to remove said host carrier tone, said host telephone interface means is actuated to enable said first input and said operator station means interactive audible communication means is actuated by said host computer, said host computer being responsive to said interactive audio mode termination signal for re-entering said text mode and being responsive, when in said text mode to predetermined user terminal key means request signals to enter said audio mode wherein said audio index memory is accessed in correspondence with said request signals to derive said indexing signals for accessing said audio memory means, said host telephone interface means is actuated to receive said audio signals at said second input and effect said transmission of said audio telephonic signals and said host modem means is actuated to remove said host carrier tone from said linkage, said host computer accessing select said text memory retained textual information in response to transmitted said request signals designated as a request for textual information when in said text mode for effecting the transmission of said select textual information from said host modem means as said textual character signals.

24. The system of claim 23 in which:

said audio memory means is responsive to the termination of an audio signal generation corresponding with said conveyed indexing signals for generating a completion signal; and said host computer is responsive to said completion signal for re-entering said text mode, removing said host telephone interface means actuation, and enabling said host modem means to assert said host carrier tone.

25. The system of claim 23 in which:

said terminal modem means includes telephone dialing means responsive to said terminal computer means actuation for telephonically accessing said host modem means; and said terminal computer means program is configured to enter said audio mode during said telephonic access.

26. The system of claim 23 in which:

said host computer program is configured for effecting the telephonic transmission by said host modem means of a predetermined command signal during said text mode at the termination of transmission of a predetermined quantity of said textual character signals; and said terminal computer means program is configured for effecting the transmission by said terminal modem means of only predetermined said user terminal key means to request signals in response to terminal modem means receipt of said predetermined command signal.

27. The system of claim 23 in which:

said terminal modem means is responsive to the presence of a said host carrier tone to provide a carrier detect signal; and said terminal computer means is responsive to said carrier detect signal to effect a said actuation enabling said terminal modem means and entry of said terminal program into said text mode.

28. The system of claim 27 in which said terminal computer means is responsive to a termination of said carrier detect signal when said terminal program is in said text mode for enabling said terminal telephone interface, actuating said terminal modem means to effect removal of said terminal carrier tone, and effecting entry of said terminal program into said audio mode.

29. The system of claim 23 in which:

said host computer program is configured for effecting the transmission by said host modem means of a no response signal subsequent to said response to said interactive audio communication signal in the absence of said operator acknowledge signal; and said terminal computer means is responsive to said transmitted no response signal as a said command signal to remain within said text mode.

30. The system of claim 33 in which said terminal computer means is responsive to said operator acknowledge signal received at said terminal modem means and to a subsequent said actuation of said host modem means removing said host carrier tone to effect said actuation of said terminal modem means to remove said terminal carrier tone.

31. The system of claim 23 in which said host computer means program is responsive, when in said interactive audio mode, to a said assertion of said terminal carrier tone to re-enter said text mode and effect actuation of said host modem means to assert said host carrier tone upon said linkage.

32. The system of claim 23 in which said host computer means program is responsive, when in said interactive audio mode, to a said operator station means terminal means key means interactive audio mode termination signal for effecting actuation of said host modem means to assert said host carrier tone upon said linkage.

33. The system of claim 23 in which:

said user terminal key means is configured for generating a said request signal as an interactive audio mode user termination signal; and said terminal program is configured for response to said interactive audio mode user termination signal for effecting actuation of said terminal modem means to assert said terminal carrier tone upon said linkage.

34. The system of claim 33 in which said readout means comprises:

video circuit means responsive to said terminal computer means for generating video signals at an output thereof corresponding with received said textual character signals transmitted during said text mode; and R.F. modulator means having an output connectable with the input of a television receiver and responsive to modulate said video signals with a select carrier for effecting imaging by said television receiver and to transmit said audio signals to said input.

* * * * *